(12) United States Patent
Turgeman et al.

(10) Patent No.: US 12,674,970 B2
(45) Date of Patent: Jul. 7, 2026

(54) MICROSCOPY SYSTEM AND METHOD USING AN IMMERSION LIQUID

(71) Applicant: IDEA MACHINE DEVELOPMENT DESIGN AND PRODUCTION LTD., Rehovot (IL)

(72) Inventors: Shlomo Turgeman, Rishon Letzion (IL); Eitan Sheffer, Ramat Gan (IL); Yael Paran, Moshav Beit Oved (IL); Shimon Weitzhandler, Raanana (IL); Ephraim Schwartz, Jerusalem (IL); Alon Atzei-Pri, Rosh HaAyin (IL)

(73) Assignee: IDEA MACHINE DEVELOPMENT DESIGN & PRODUCTION LTD., Rehovot (IL)

( * ) Notice: Subject to any disclaimer, the term of this patent is extended or adjusted under 35 U.S.C. 154(b) by 181 days.

(21) Appl. No.: 18/384,895

(22) Filed: Oct. 30, 2023

(65) Prior Publication Data

US 2024/0061229 A1 Feb. 22, 2024

Related U.S. Application Data

(63) Continuation-in-part of application No. PCT/IB2022/053972, filed on Apr. 28, 2022.

(Continued)

(51) Int. Cl.
*G02B 21/33* (2006.01)
*G02B 21/00* (2006.01)
*G02B 21/36* (2006.01)

(52) U.S. Cl.
CPC ......... *G02B 21/33* (2013.01); *G02B 21/0036* (2013.01); *G02B 21/006* (2013.01); *G02B 21/365* (2013.01)

(58) Field of Classification Search
CPC .. G02B 21/33; G02B 21/0036; G02B 21/006; G02B 21/365

(Continued)

(56) References Cited

U.S. PATENT DOCUMENTS

| | | | |
|---|---|---|---|
| 7,304,793 B2 | 12/2007 | Hummel | |
| 7,333,265 B2 | 2/2008 | Kazuhiro et al. | |

(Continued)

FOREIGN PATENT DOCUMENTS

| | | |
|---|---|---|
| DE | 202017000475 U1 | 2/2017 |
| EP | 1717628 B1 | 1/2012 |
| JP | 2010160449 A | 7/2010 |

OTHER PUBLICATIONS

"Water Immersion Micro Dispenser", Leica Microsystems, first published 2012, available at https://www.leica-microsystems.com/products/light-microscopes/p/leica-water-immersion-micro-dispenser/.

(Continued)

*Primary Examiner* — William Choi
(74) *Attorney, Agent, or Firm* — Daniel Feigelson

(57) ABSTRACT

There is provided a microscopy device capable of (i) moving a liquid immersion objective lens to a location where liquid, such as an oil or water, can be applied to the liquid immersion objective lens, and (ii) moving the liquid immersion objective lens having liquid applied thereto to a sample holder, to be used to acquire images of a sample. The liquid application process can be automated so that the liquid on the objective lens is replenished as necessary. The device can automatically focus the lens to facilitate scanning, and can be configured to change objective lenses. Other embodiments, including using such a device in high content/high throughput scanning, are also described.

37 Claims, 28 Drawing Sheets

Related U.S. Application Data

(60) Provisional application No. 63/421,593, filed on Nov. 2, 2022, provisional application No. 63/180,694, filed on Apr. 28, 2021, provisional application No. 63/180,693, filed on Apr. 28, 2021.

(58) Field of Classification Search
USPC ......................................................... 359/656
See application file for complete search history.

(56) References Cited

U.S. PATENT DOCUMENTS

| | | | | |
|---|---|---|---|---|
| 7,852,552 B2 * | 12/2010 | Harada | ................ | G02B 21/248 |
| | | | | 359/368 |
| 9,170,412 B2 | 10/2015 | Turgeman et al. | | |

OTHER PUBLICATIONS

"Liquid Immersion", Marhauzen Wetzlar, available at https://products.marzhauser.com/en/data/liquid-immersion-c71, first publication unknown.

"Liquid Dispenser", Marhauzen Wetzlar, available at https://products.marzhauser.com/en/data/liquid-dispenser-c5678, first publication unknown.

"Liquid Immersion", Marhauzen Wetzlar, available at https://web.archive.org/web/20211209220724/https://www.marzhauser.com/en/products/liquid-immersion.html, archived Dec. 9, 2021.

* cited by examiner

1010

1020

1030

1040

1040a

1050

1010

1020

1020a

1030

1040

1050

1060

1040a

1040

1050

1060

1030

1040

1050

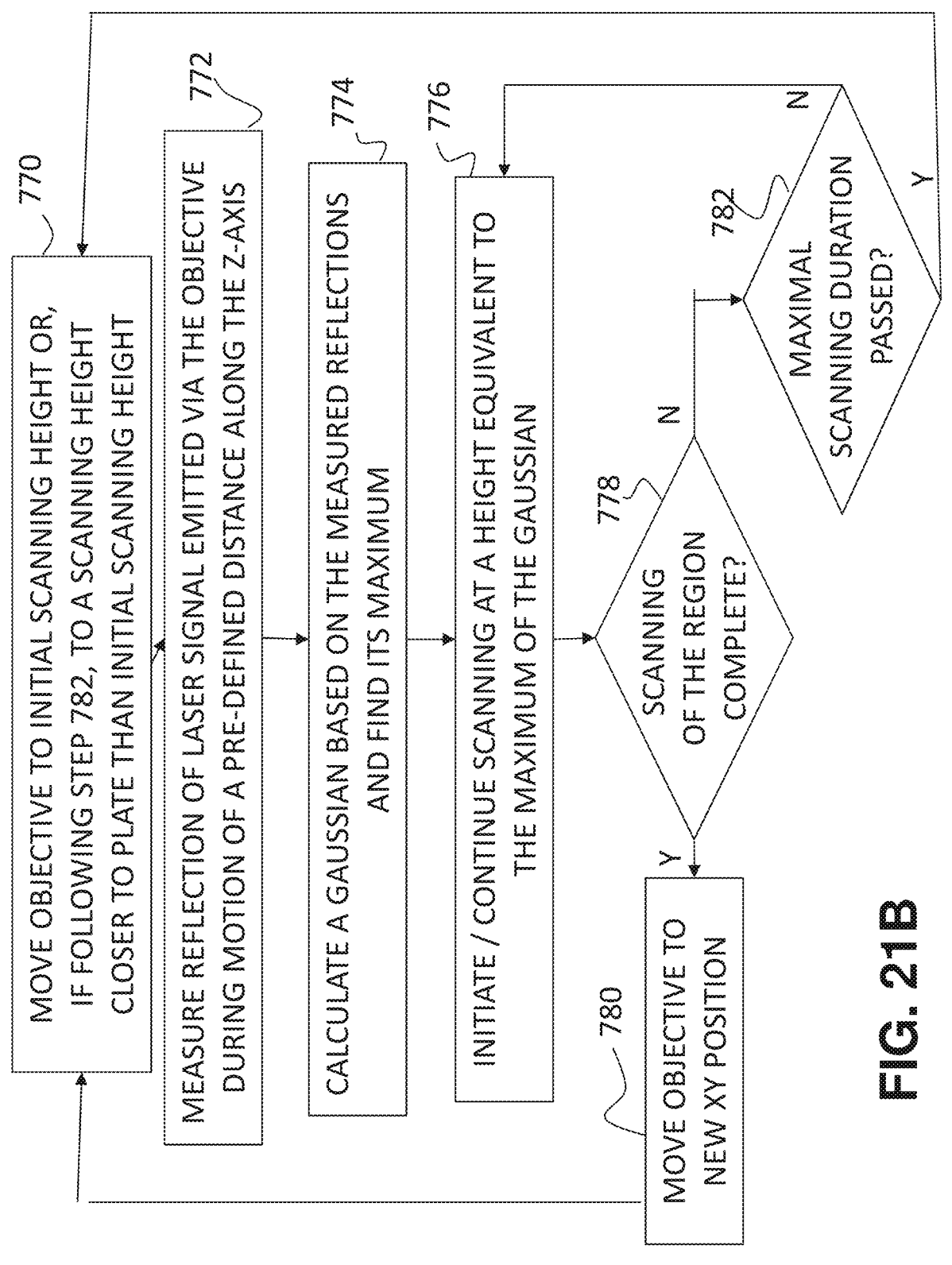

770 — MOVE OBJECTIVE TO INITIAL SCANNING HEIGHT OR, IF FOLLOWING STEP 782, TO A SCANNING HEIGHT CLOSER TO PLATE THAN INITIAL SCANNING HEIGHT

772 — MEASURE REFLECTION OF LASER SIGNAL EMITTED VIA THE OBJECTIVE DURING MOTION OF A PRE-DEFINED DISTANCE ALONG THE Z-AXIS

774 — CALCULATE A GAUSSIAN BASED ON THE MEASURED REFLECTIONS AND FIND ITS MAXIMUM

776 — INITIATE / CONTINUE SCANNING AT A HEIGHT EQUIVALENT TO THE MAXIMUM OF THE GAUSSIAN

778 — SCANNING OF THE REGION COMPLETE?

780 — MOVE OBJECTIVE TO NEW XY POSITION

782 — MAXIMAL SCANNING DURATION PASSED?

FIG. 21B

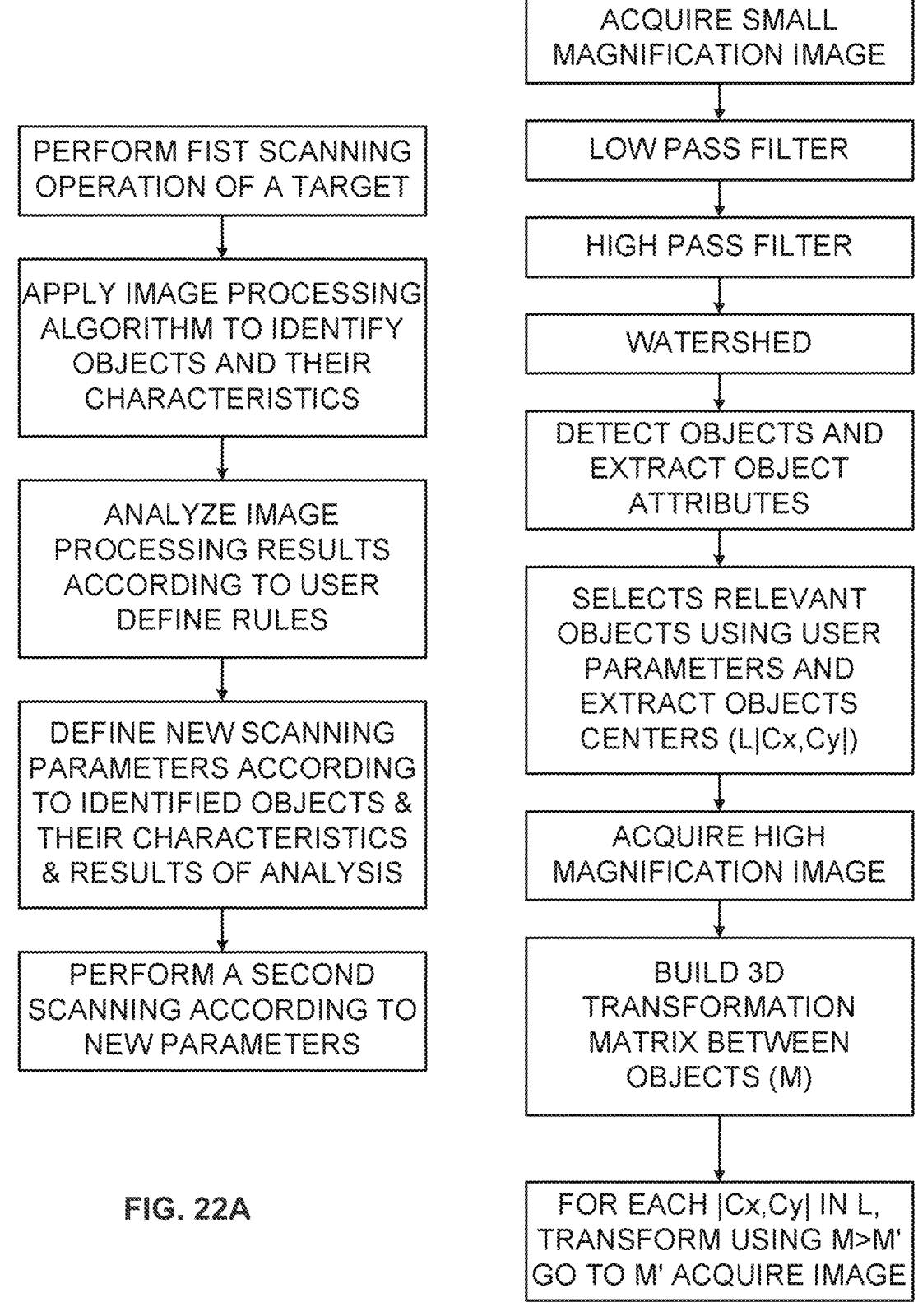

PERFORM FIST SCANNING OPERATION OF A TARGET

APPLY IMAGE PROCESSING ALGORITHM TO IDENTIFY OBJECTS AND THEIR CHARACTERISTICS

ANALYZE IMAGE PROCESSING RESULTS ACCORDING TO USER DEFINE RULES

DEFINE NEW SCANNING PARAMETERS ACCORDING TO IDENTIFIED OBJECTS & THEIR CHARACTERISTICS & RESULTS OF ANALYSIS

PERFORM A SECOND SCANNING ACCORDING TO NEW PARAMETERS

FIG. 22A

ACQUIRE SMALL MAGNIFICATION IMAGE

LOW PASS FILTER

HIGH PASS FILTER

WATERSHED

DETECT OBJECTS AND EXTRACT OBJECT ATTRIBUTES

SELECTS RELEVANT OBJECTS USING USER PARAMETERS AND EXTRACT OBJECTS CENTERS (L|Cx,Cy|)

ACQUIRE HIGH MAGNIFICATION IMAGE

BUILD 3D TRANSFORMATION MATRIX BETWEEN OBJECTS (M)

FOR EACH |Cx,Cy| IN L, TRANSFORM USING M>M' GO TO M' ACQUIRE IMAGE

FIG. 23

MICROSCOPY SYSTEM AND METHOD USING AN IMMERSION LIQUID

CROSS-REFERENCE TO RELATED APPLICATIONS

This application is a continuation-in-part of PCT/IB2022/053972, filed Apr. 28, 2022, and claims the benefit of U.S. provisional applications Nos. 63/180,693 and 63/180,694, both of which were filed on Apr. 28, 2021, through said PCT application. This application also claims the benefit of provisional application No. 63/421,593, which was filed Nov. 2, 2022. The contents of all of the aforesaid patent applications are incorporated herein by reference.

FIELD

The present invention relates to the field of accurate optical scanning and imaging of samples and more particularly, to biological microscopy using a suitable immersion liquid, such as a stable oil, as a medium between the objective and the sample.

BACKGROUND

High-content microscopy systems, used for observing biological samples, are known in the art. Such microscopy systems are typically based on a static and massive microscope body, and include complex connections to optical units such as an objective turret, an illumination unit, filter wheels, shutters, a camera, internal optics and other units. To enable the scanning of a given sample, devices to enable motion of the sample holder in the X, Y and Z directions are added to the microscope body. During the imaging process of these microscopic systems, the sample is moved to capture images at different locations along the sample, while the optics units are static.

Various automated scanning systems have been developed, in which the sample and the objective are moved relative to one another, the objective is automatically focused, and scanning occurs without human intervention. Some such systems also enable automatically changing between multiple different objective lenses, for example U.S. Pat. No. 9,170,412, the contents of which are incorporated herein by reference, describes one such system.

While such automated scanning systems are useful for scanning of biological material using an objective lens working in an air environment, these systems are unsuitable for liquid immersion microscopy. This is due, among other things, to the fact that, as the objective and sample move relative to one another, the immersion liquid is spread along the sample plate, such that the immersion liquid needs to be periodically replenished. While systems have been developed to try to replenish the liquid, see, e.g., EP 1717628 B1, DE 202017000475 U1, U.S. Pat. No. 7,304,793 B2, U.S. Pat. No. 7,852,552 B2, https://www.leica-microsystems-.com/products/light-microscopes/p/leica-water-immersion-micro-dispenser/, and https://www.marzhauser.com/en/products/liquid-immersion.html, such systems have various drawbacks, for example their design adds weight to the objective, decreases scanning area, and reduces the throughput of the microscopy system. The system depicted in U.S. Pat. No. 7,852,552 B2, for example, employs an annular tray (labeled "2b" in the drawings therein and referred to in the text as a "liquid receiving portion") around the circumference of the outermost, vertical (i.e. non-sloped) part of each objective lens shown; this tray collects excess oil that has been applied to the objective lens, and the system is provided with a tube (labelled "8a" or "15a" in the drawings therein) for siphoning off this excess oil from the tray.

There is thus a need in the art for a system and a method for automatic high-content microscopy using an immersion liquid.

DETAILED DESCRIPTION

Embodiments of the invention will be better understood from the following detailed description, as well as with reference to the figures, in which.

Figure 13:
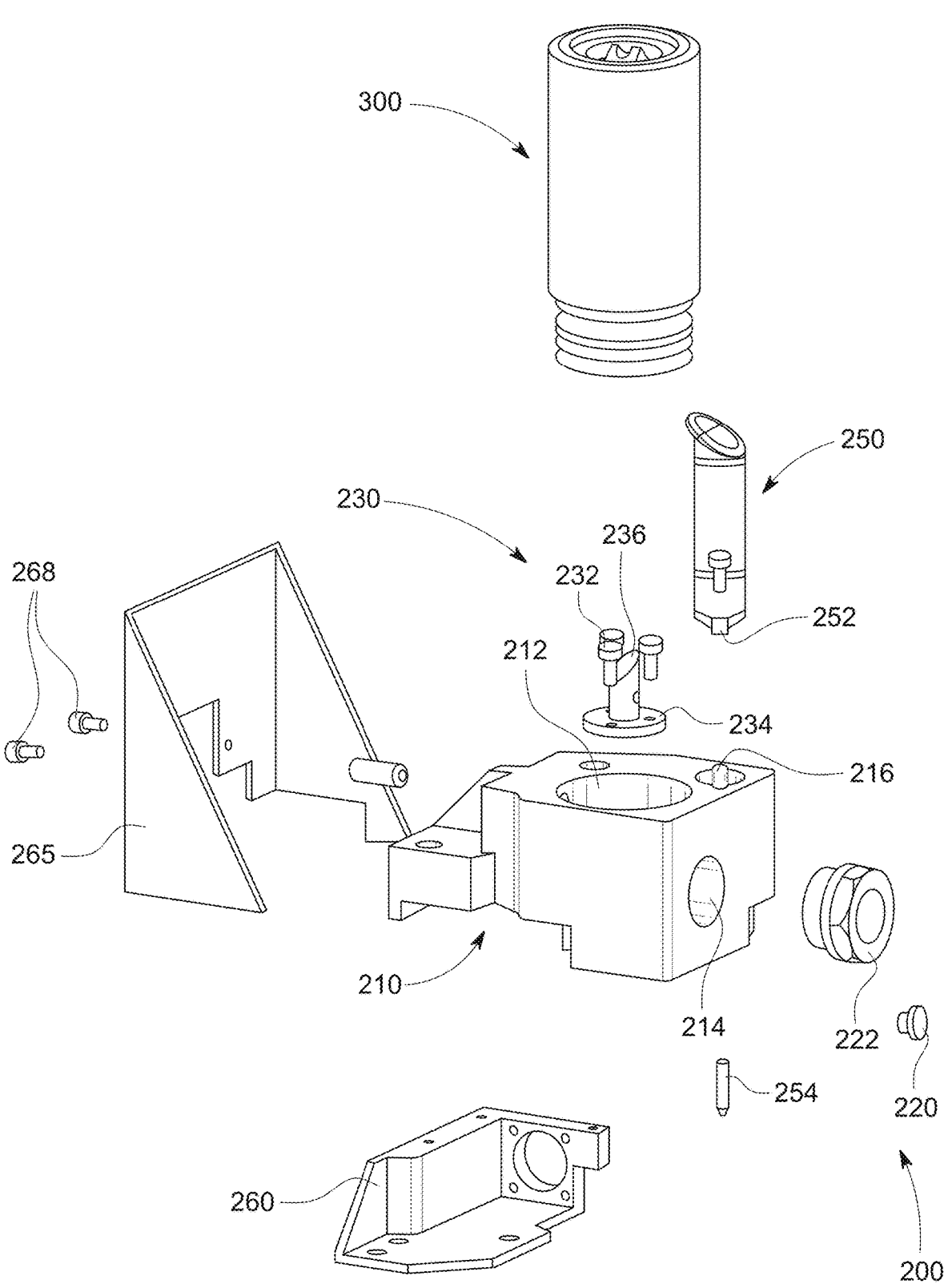
FIG. 13 is an exploded view illustration of the oil loading subassembly, in accordance with embodiments of the present invention.
Figure 14B:
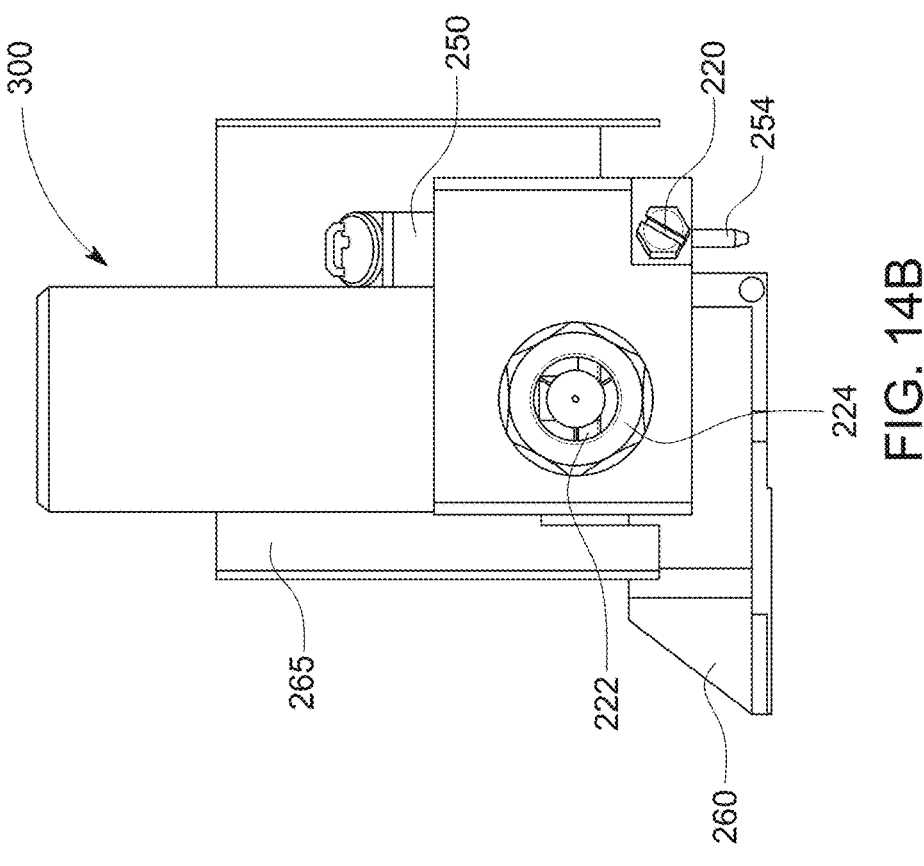
Figure 14A:
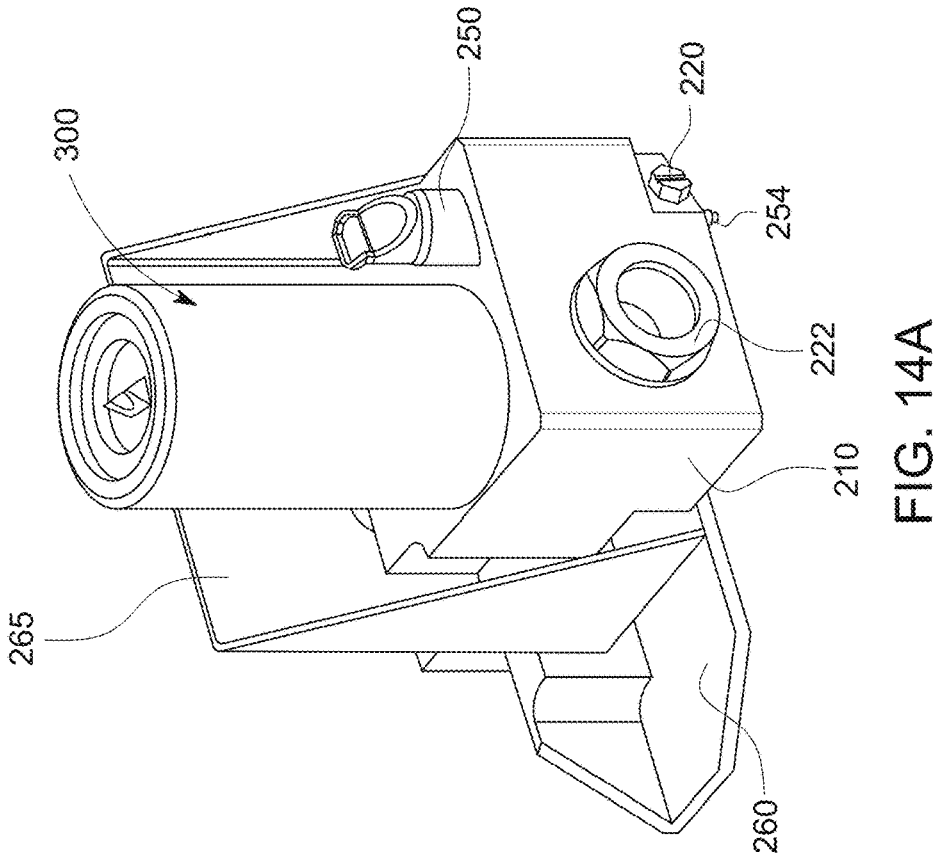
Figures 14C, 14D:
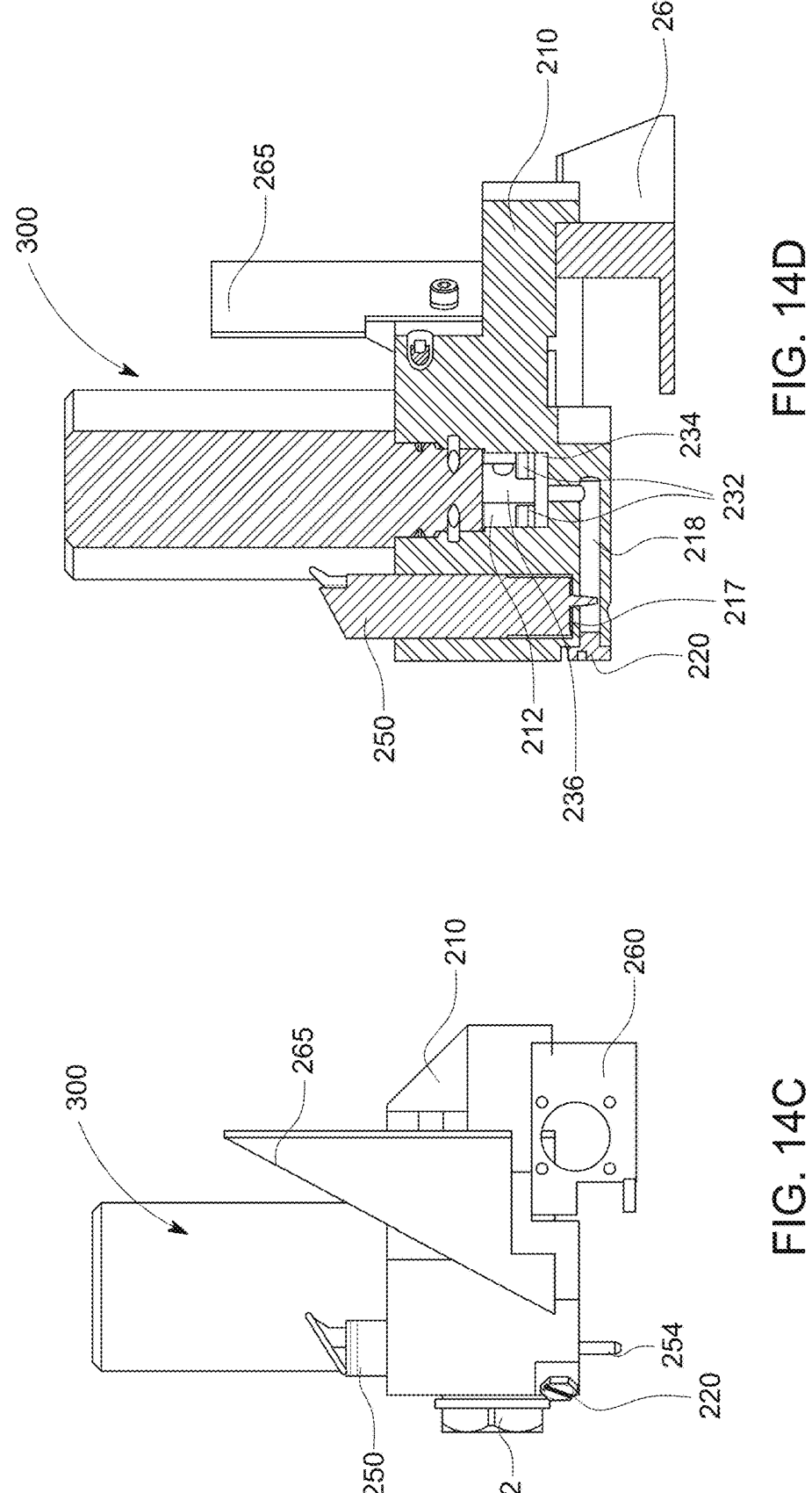
Figure 15B:
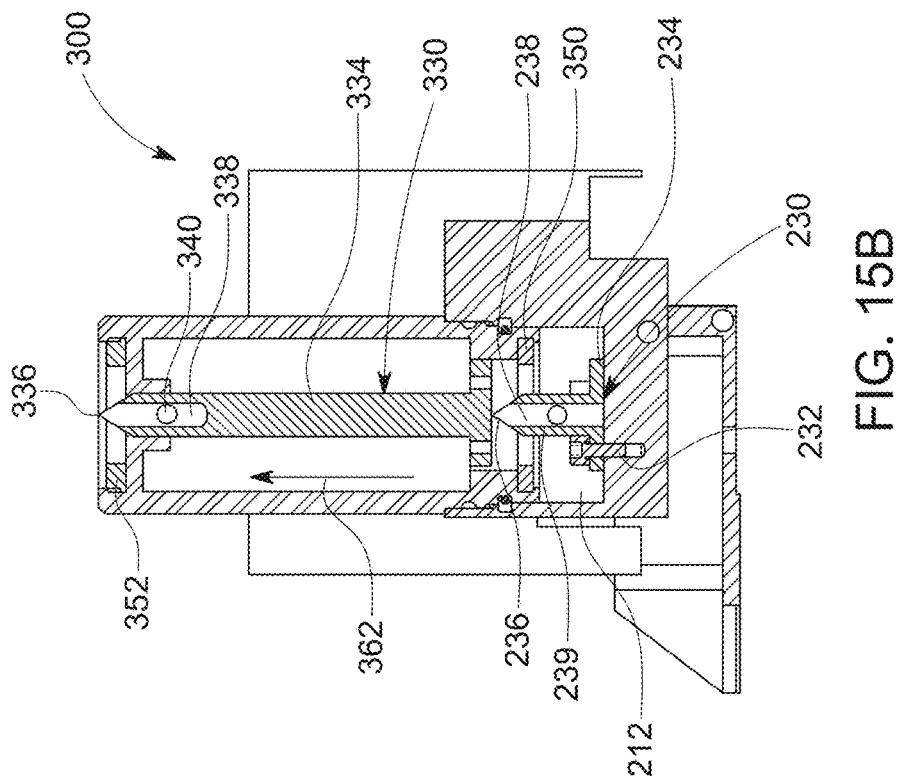
Figure 15A:
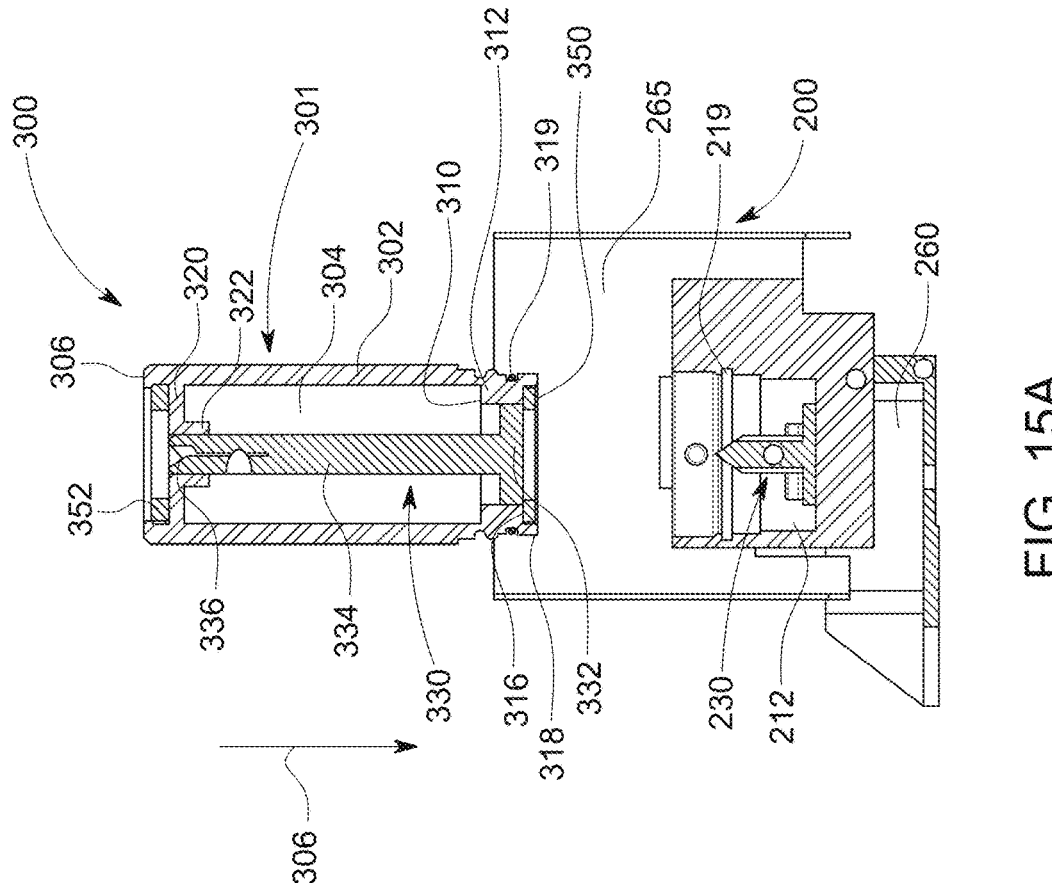
Figure 15C:
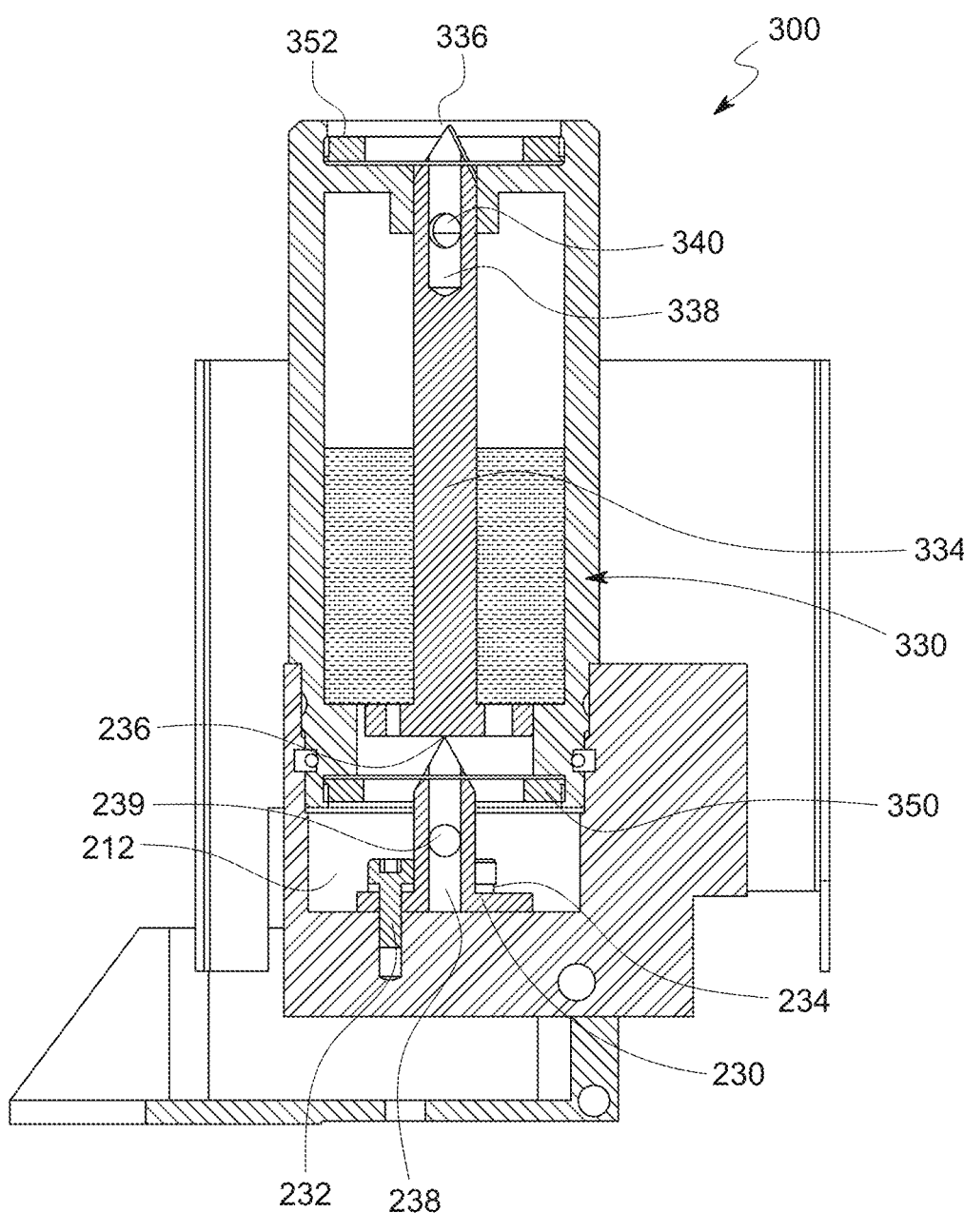
Figures 16A, 16B:
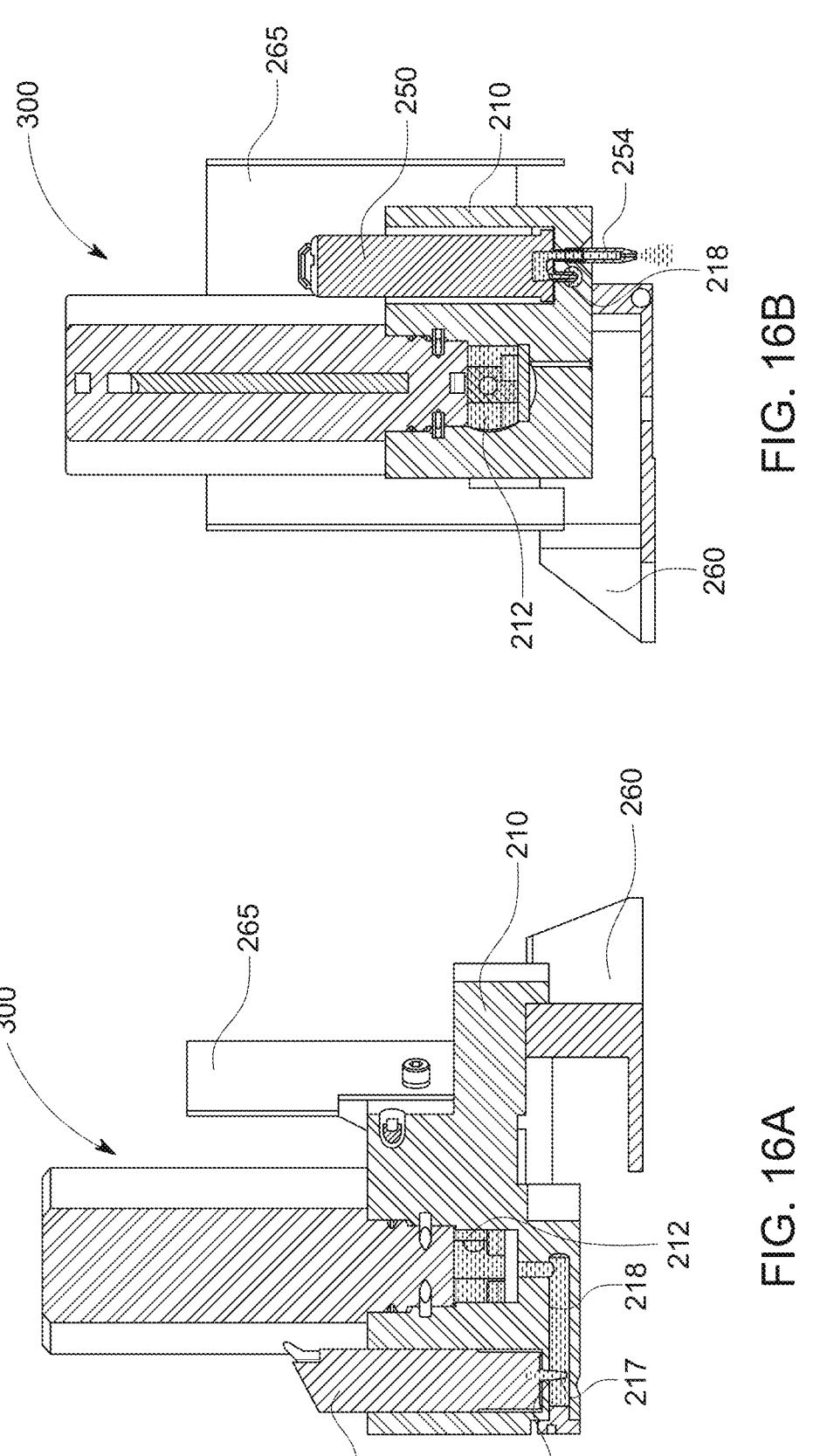
Figure 17:
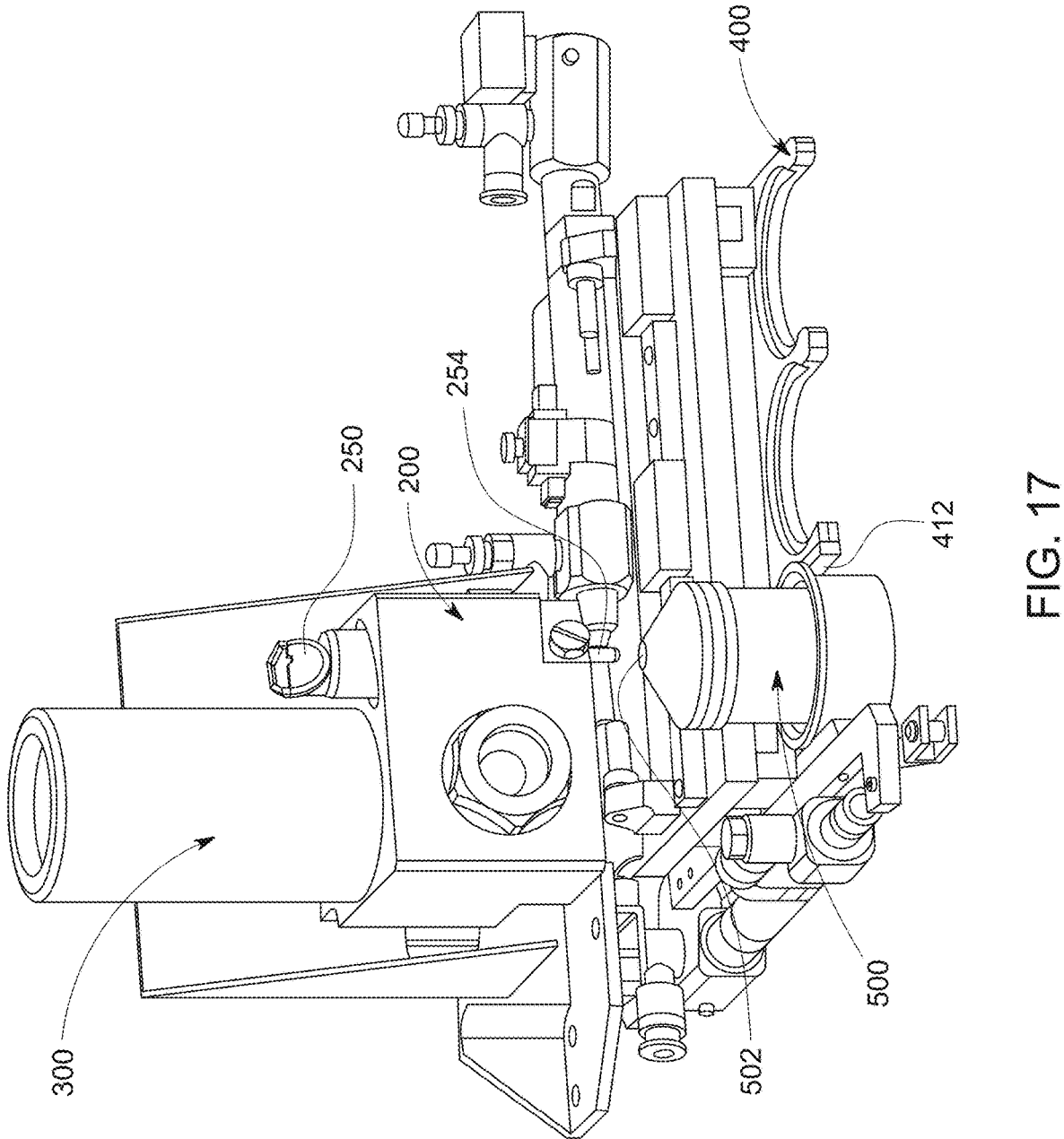
Figures 18A, 18B:
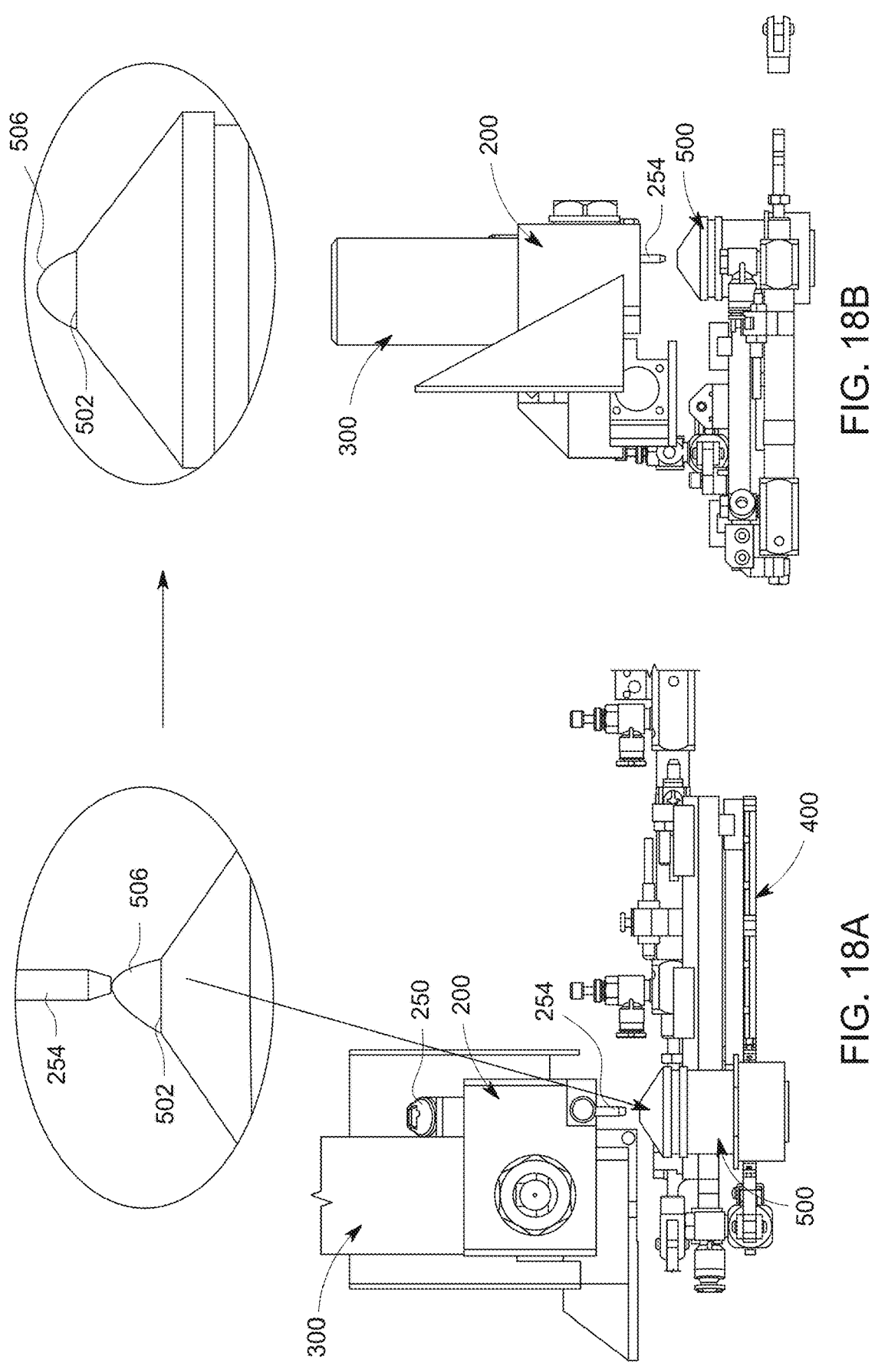
Figure 19A:
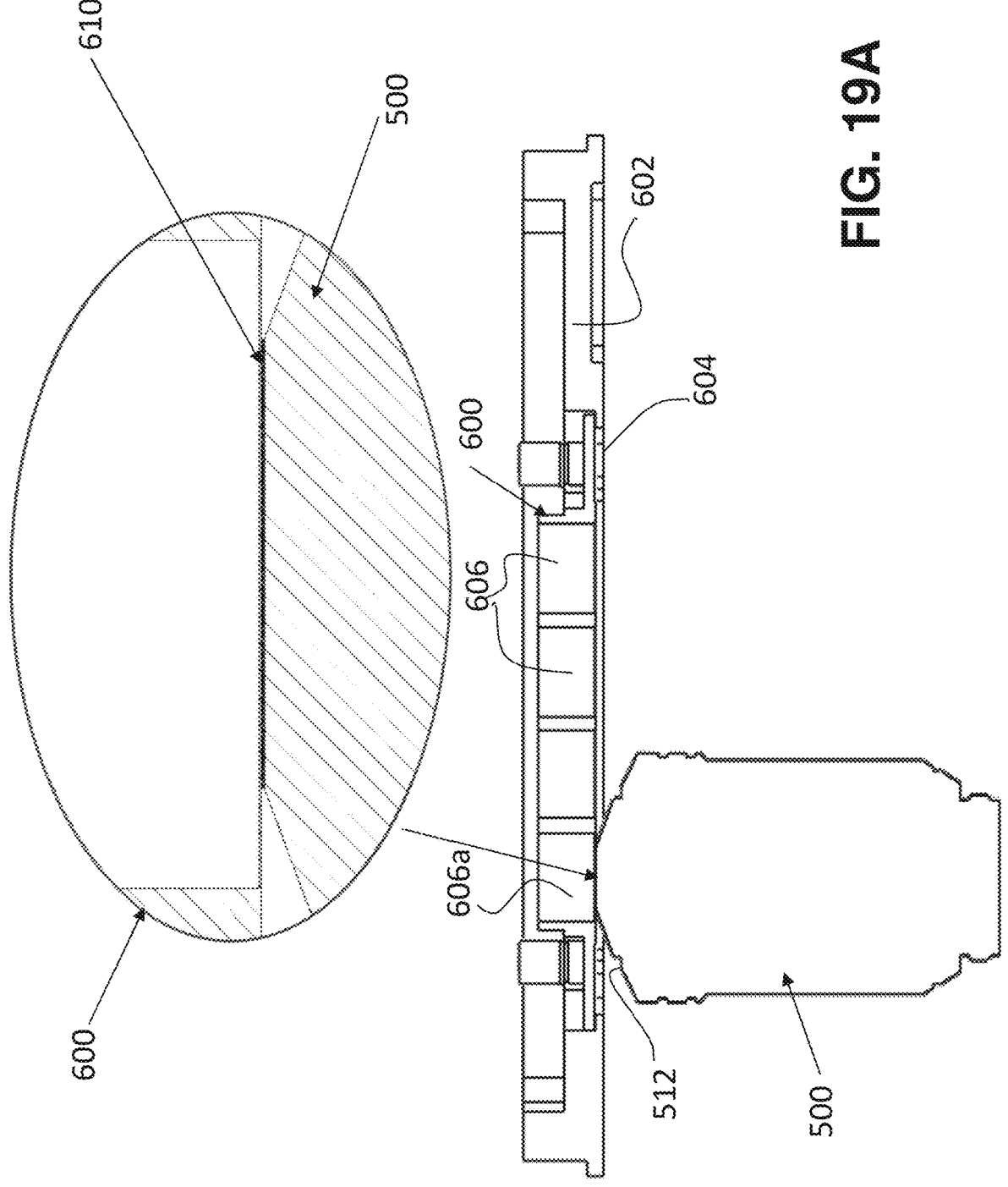
Figure 19B:
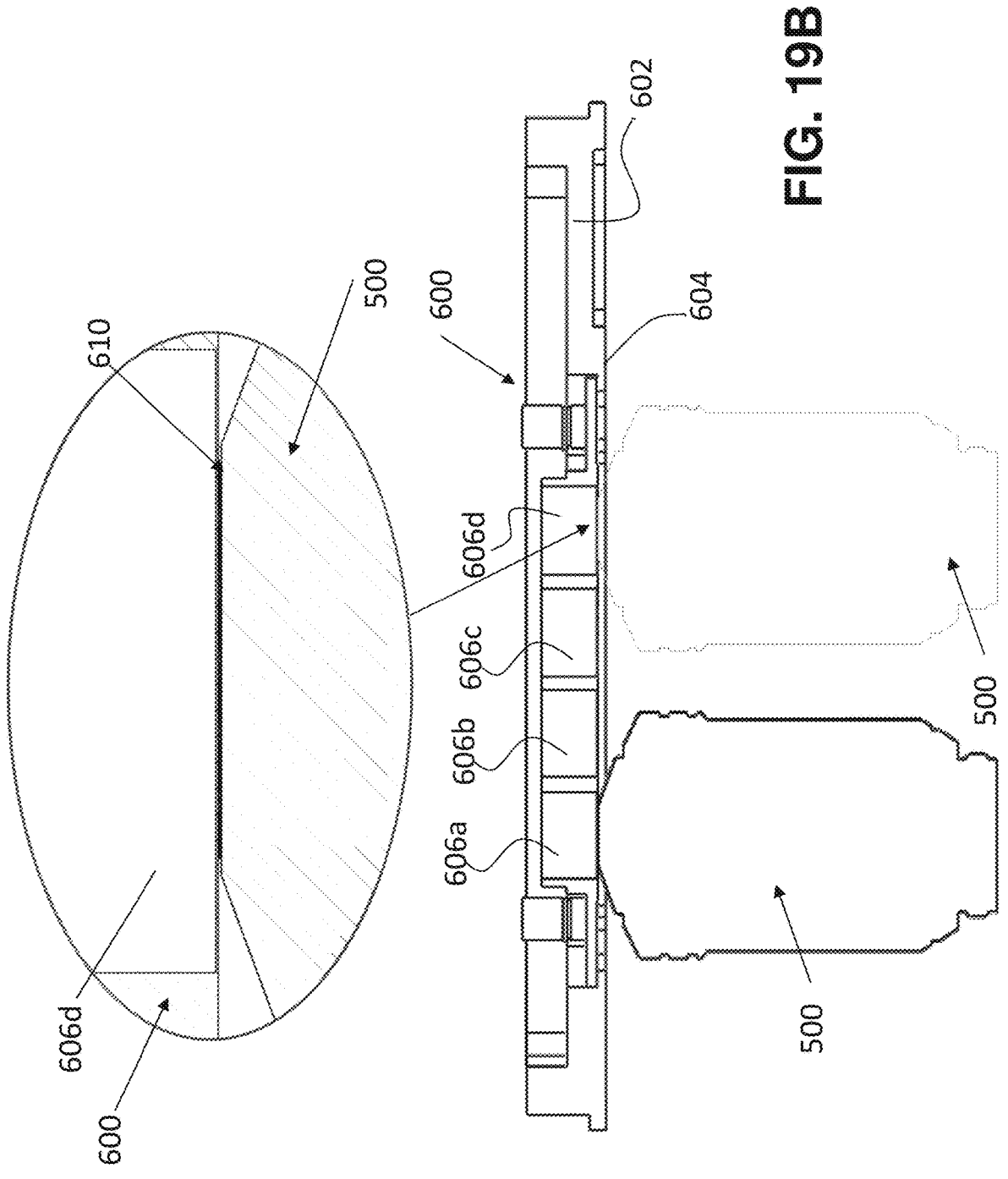
Figure 19C:
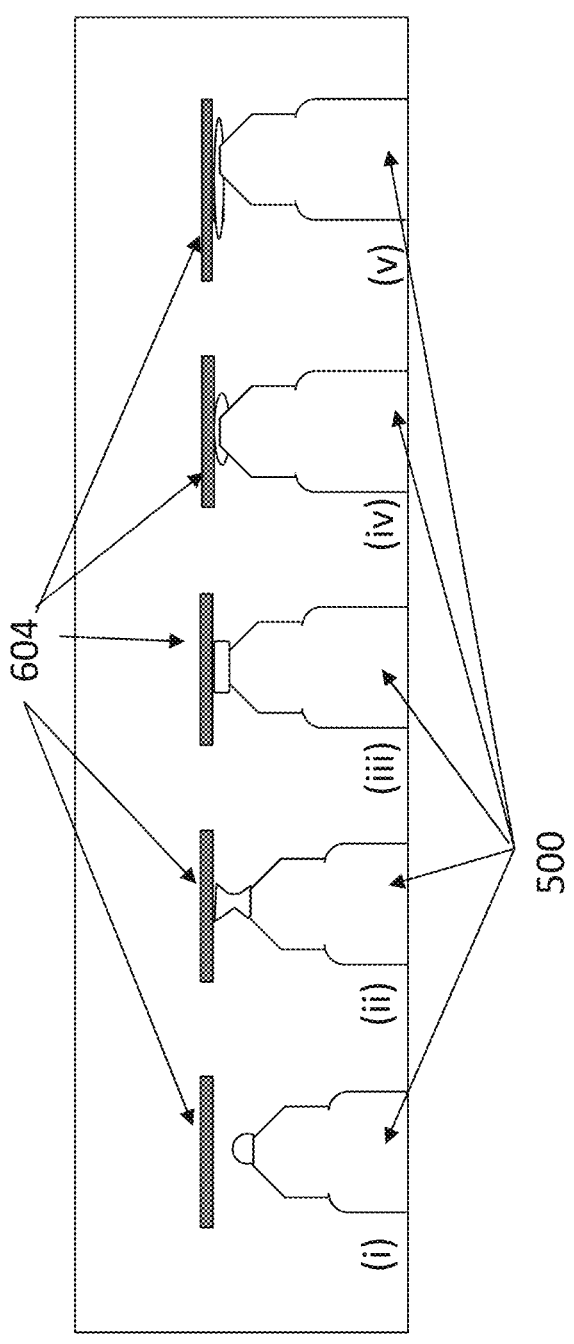
Figure 20:
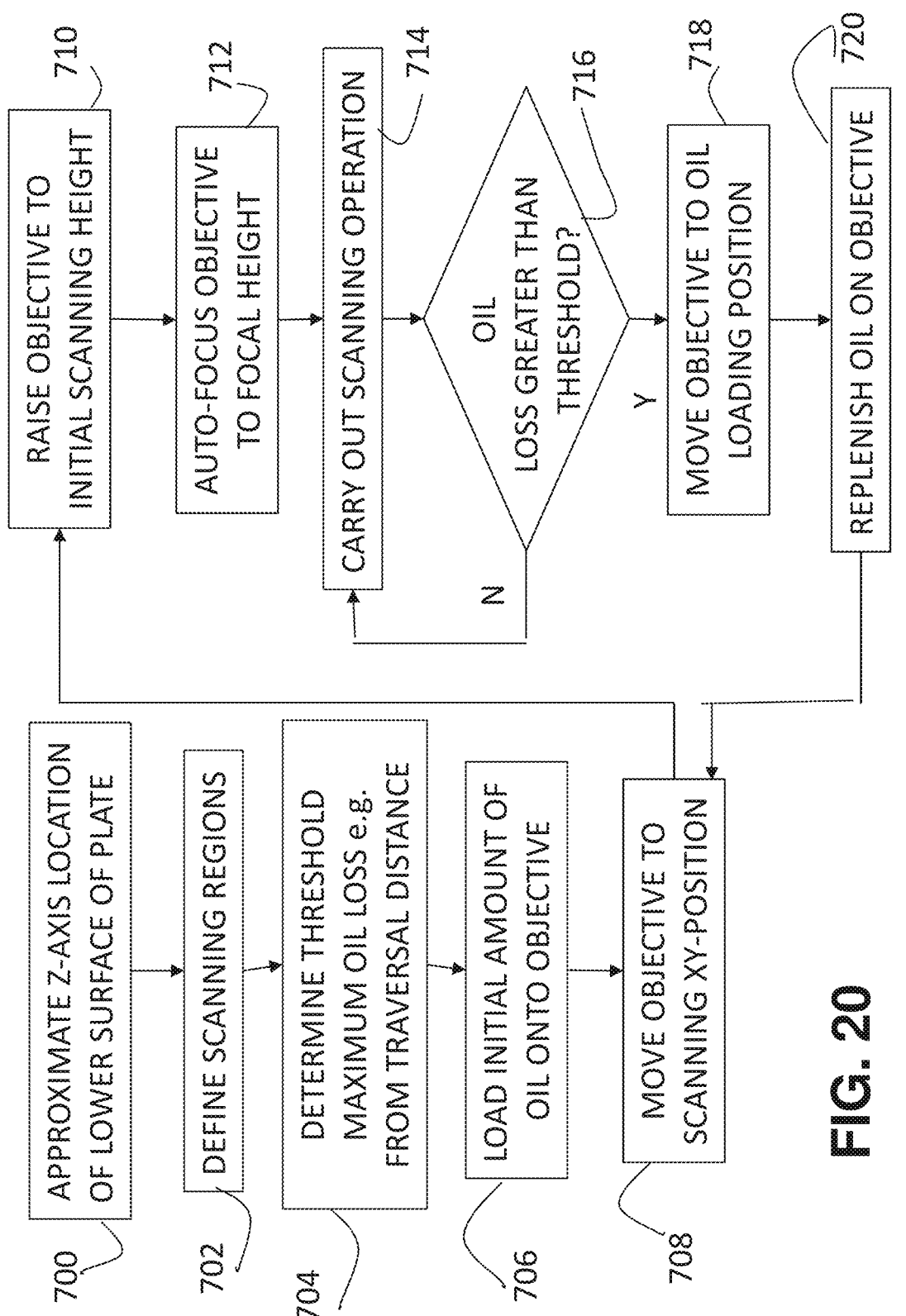
Figure 21A:
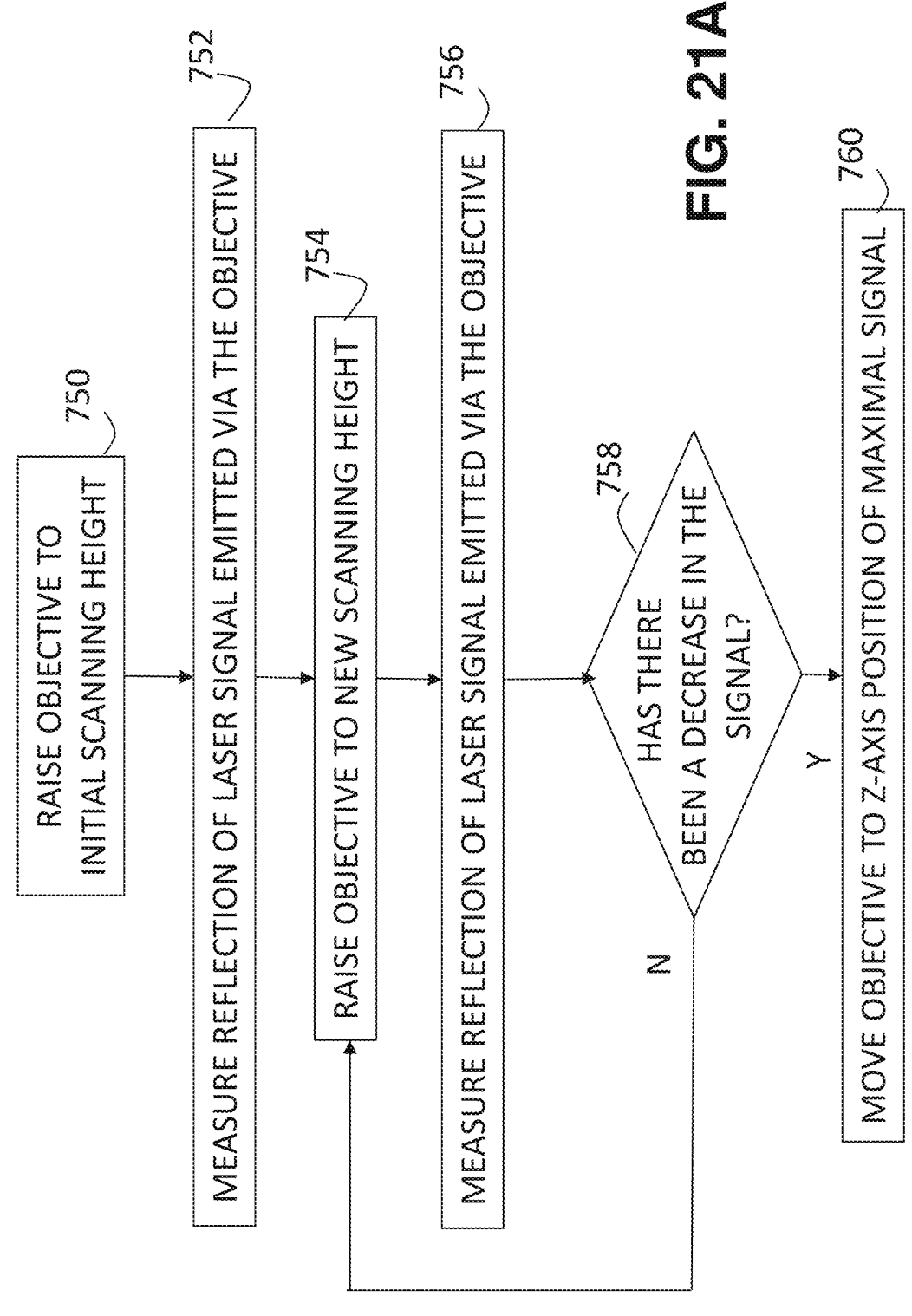
Figure 22B:
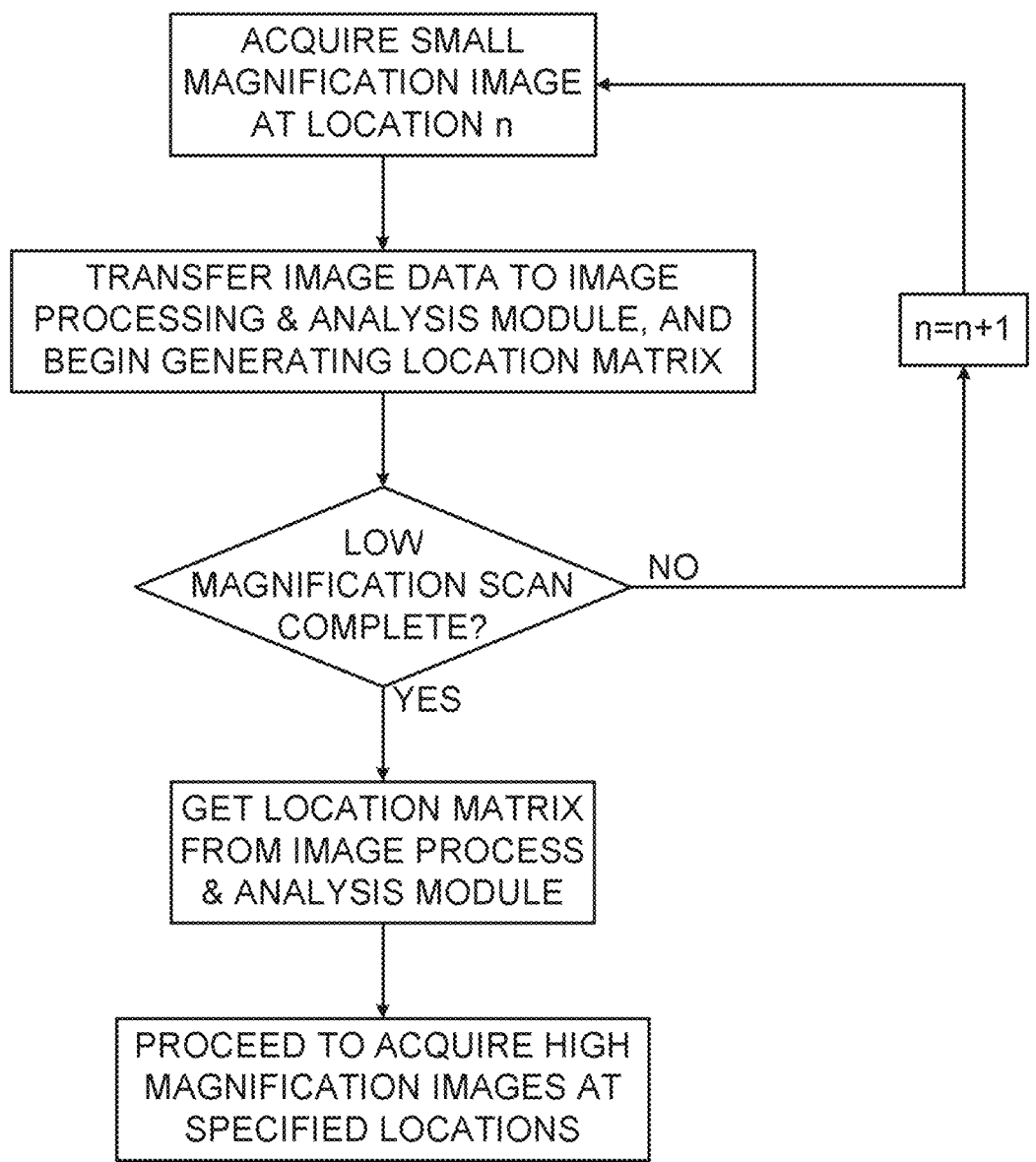
Figure 25:
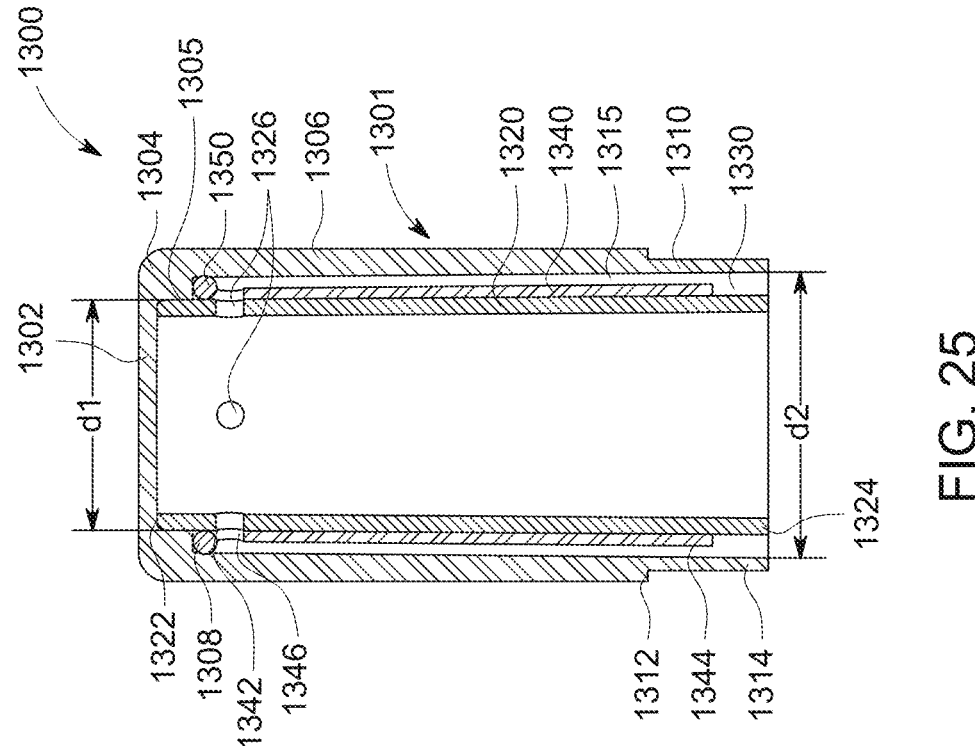
Figure 24:
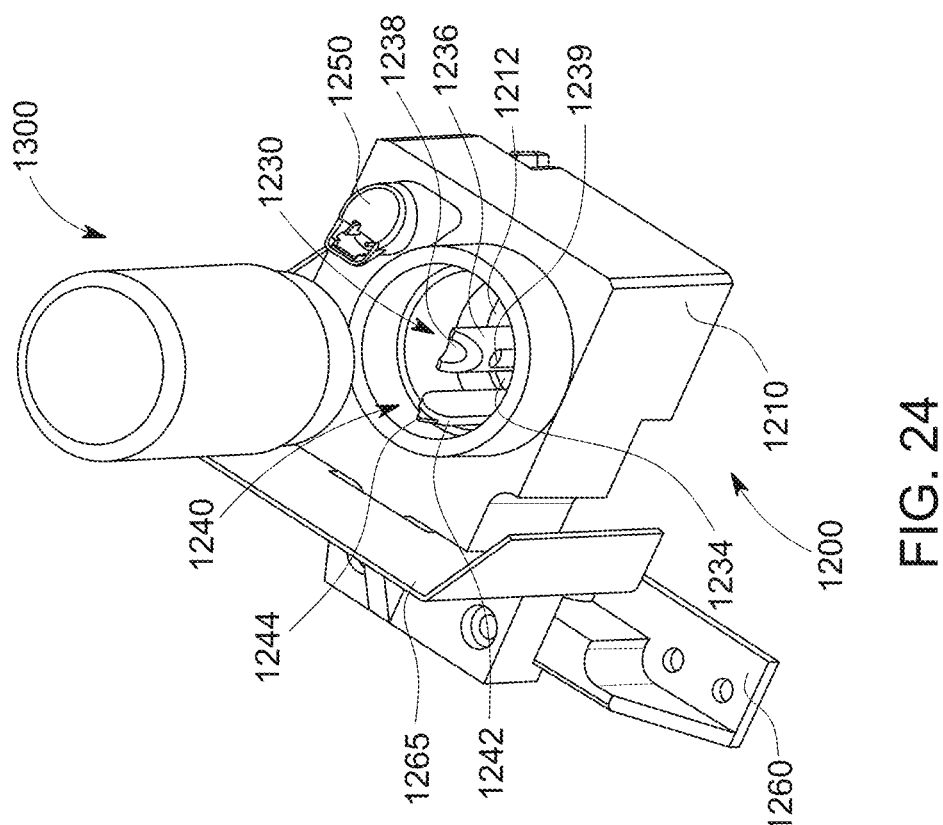
Figures 26A, 26B:
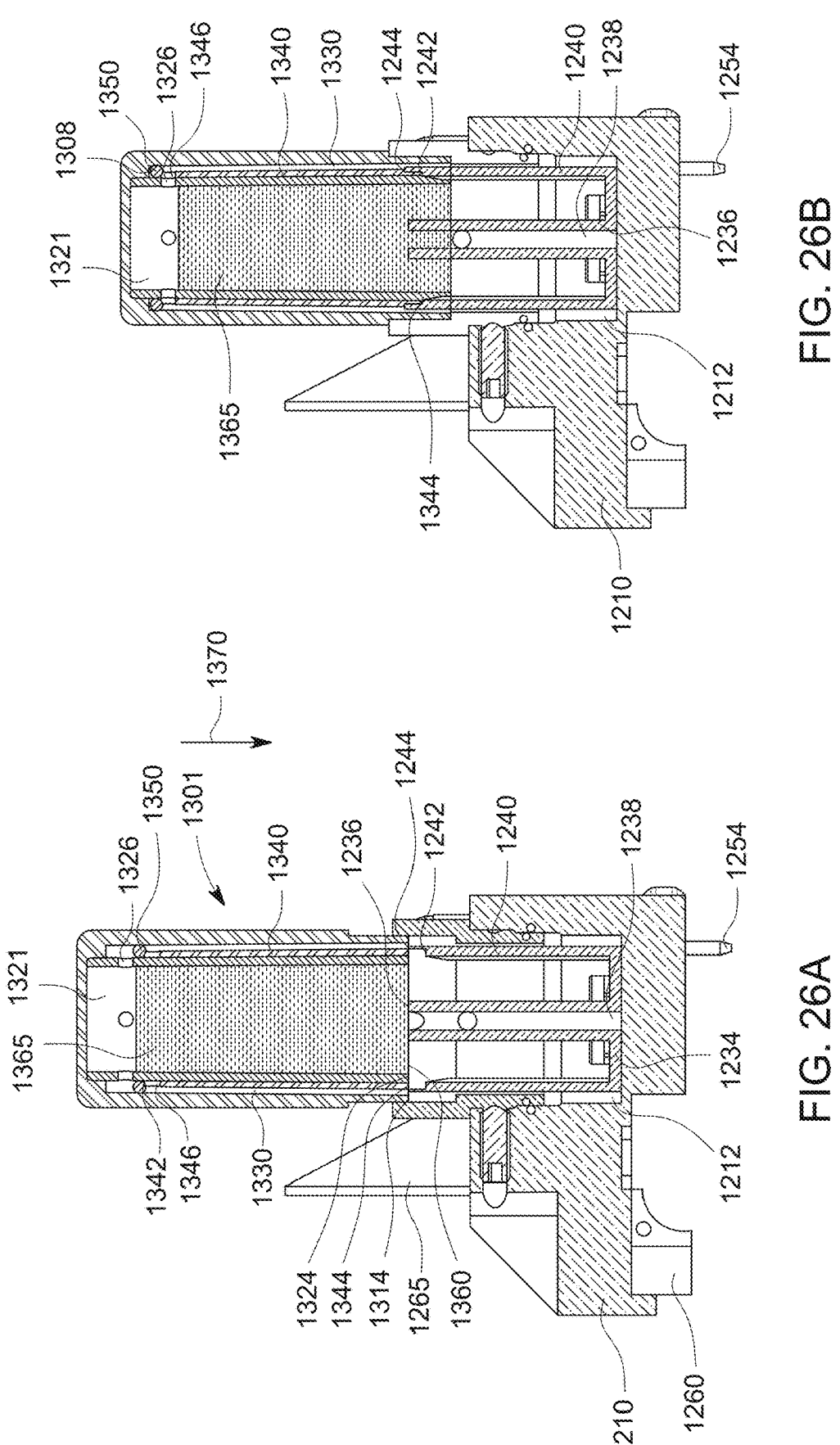

FIGS. 14A, 14B, 14C, and 14D, are, respectively, a perspective view, a planar front view, a planar side view, and a sectional view of the oil loading subassembly of FIG. 13, when constructed;

FIGS. 15A, 15B, and 15C are sectional illustrations of steps of insertion of an immersion oil cartridge into the oil loading subassembly of FIGS. 13, 14A, 14B, 14C and 14D;

FIGS. 16A and 16B are sectional illustrations illustrating the oil flow path within the oil loading subassembly of FIGS. 13, 13, 14A, 14B, 14C, 14D, 15A, 15B and 15C;

FIG. 17 is a perspective view illustration of the lens changing subassembly of FIGS. 1-11 and the oil loading subassembly of FIGS. 12, 13, 14A, 14B, 14C and 14D, including an objective lens in an immersion oil loading position of the lens changing subassembly;

FIGS. 18A and 18B are, respectively, a front view illustration and a side view illustration of loading of immersion oil onto the objective lens in the structure of FIG. 17;

FIGS. 19A, 19B, and 19C illustrate the spreading of the immersion oil as the objective lens moves relative to a viewing surface;

FIG. 20 is a flow chart outlining a method for scanning a sample using an oil immersion lens, and reloading immersion oil onto the oil immersion lens, in accordance with embodiments of the present invention;

FIGS. 21A and 21B are flow charts outlining a method for automatically focusing an oil-loaded oil-immersion lens on a biological sample, in accordance with embodiments of the invention;

FIGS. 22A, 22B and 23 are flowcharts outlining a method for scanning a sample, in accordance with embodiments of the invention;

FIG. 24 is a perspective view illustration of the oil loading subassembly, according to another embodiment of the present invention;

FIG. 25 is a sectional illustration of an immersion oil cartridge, according to another embodiment of the present invention; and FIGS. 26A and 26B are sectional illustrations of steps of insertion of the immersion oil cartridge of FIG. 25 into the oil loading subassembly of FIG. 24.

It will be appreciated that despite the prevalence of color drawings and photographs in the scientific literature and the ease of presentation of such in electronic format, PCT rules remain mired in the 19th century and still do not permit the filing of color drawings or photographs, and the USPTO only allows color drawings or photographs pursuant to a petition. Therefore FIGS. 13, 14A, 14B, 14C, 14D, 15A, 15B, 15C, 16A, 16B, 17, 18A, 18B, 19B, 19C, 24, 25, 26A and 26B are being filed with this application as black-and-white drawings. However, the original drawings are in color and, for the purpose of making them publicly available, have been uploaded to a publicly-available picture sharing service, Shutterfly, and can be accessed over the internet by anyone using the link https://dripperpatentcolordrawings.shutterfly.com/pictures#n_5; this link was first publicly disclosed in the publication of PCT/IB2022/053972, and the color drawings are incorporated herein by reference.

Figure 1:
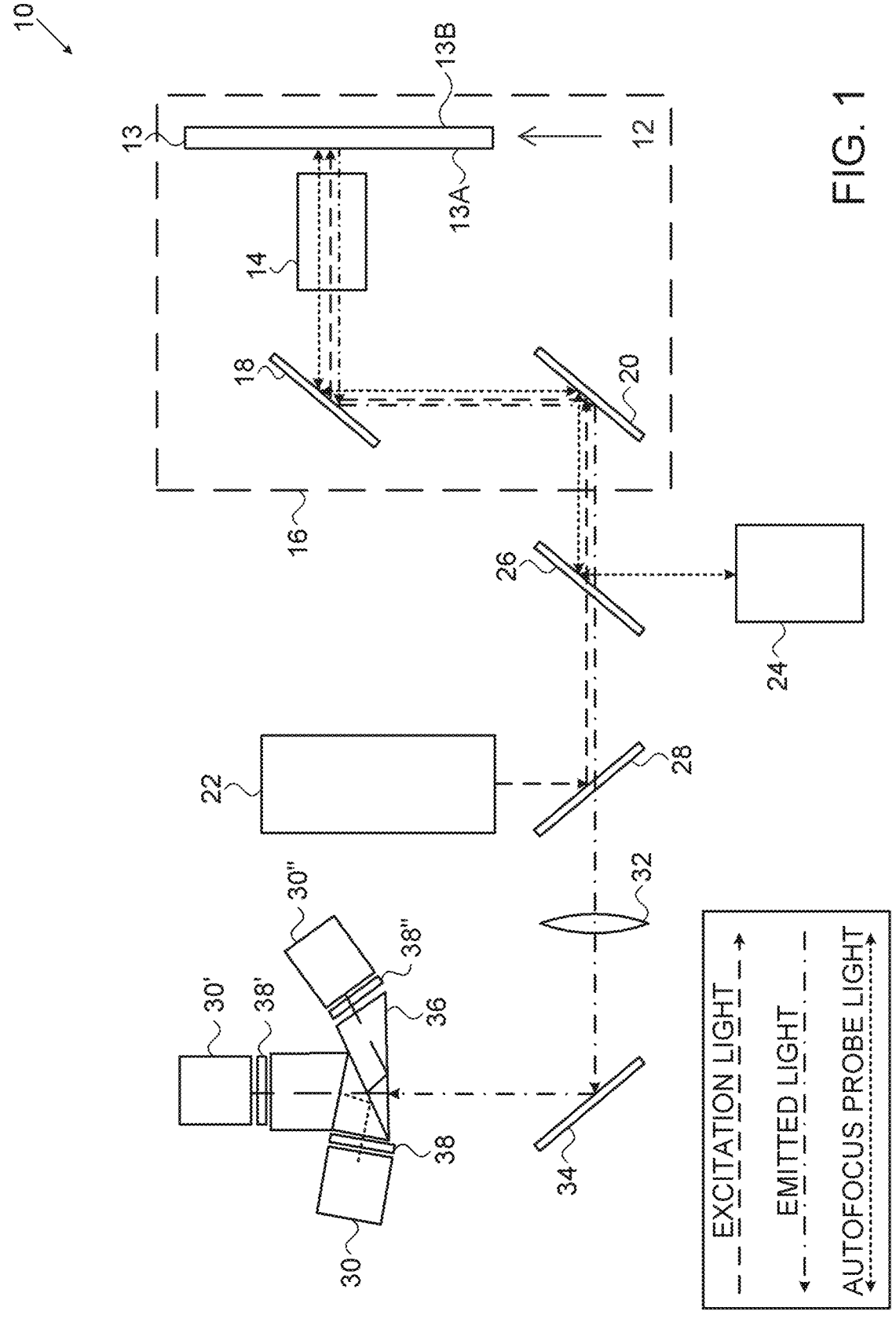
FIG. 1 is a schematic diagram of an embodiment of a microscopy system which can be adapted for use in accordance with to an embodiment of the present invention.

Reference is now made to FIG. 1, which is a block diagram showing schematically an apparatus 10 constructed and operative so as to be adapted for use in accordance with embodiments of the invention. Apparatus 10 contains a holder 12, which may be configured to hold a sample plate 13, for example a 6-, 24-, 96-, 384 or 1536-well plate commonly used to hold biological samples and having lower and upper faces 13A and 13B, respectively, containing a sample or multiple samples to be observed, as is known in the art. Holder 12 may also be configured to hold a microscope slide, a Petri dish, or another substrate having a bottom that is transparent to electromagnetic radiation of a wavelength or wavelengths of interest. For reference, sample plate 13, which is not itself part of the apparatus, lies in the XY-plane, so that through its lower face 13A, samples contained therein will be opposite the components of apparatus 10 that will be described below.

A turretless objective lens, viz. a single objective lens 14 that is not mounted on a turret with other lenses, which is part of a linear XYZ scanner 16, is arranged so that the lens lies facing the sample holder (and, when a sample plate 13 is present, facing the lower face 13A of sample plate 13), and the optical axis of objective lens 14 lies along the Z-axis with respect to the sample holder. By "linear XYZ scanner" is meant a mechanism constructed and operative to move the objective lens 14 in three mutually perpendicular directions, wherein the "Z" direction is used to denote movement along the optical axis. Such scanners per se are known in the art, for example from Israel Patent No. 143836, filed Jun. 19, 2001 and entitled "Compact Linear Scanner System" or U.S.

Pat. No. 6,850,362, the contents of both of which are incorporated herein by reference. It will be appreciated that for the sake of simplicity, only some of the components of XYZ scanner 16 are shown in FIG. 1; a more detailed description of this component follows below. Among the components of the XYZ scanner that are shown in FIG. 1 are mirrors 18 and 20, which work together to redirect light along the optical axis of objective lens 14, such as when the XYZ scanner is arranged to operate in an inverse microscope configuration, to reflect light from illumination unit 22 and from autofocus unit 24 through objective lens 14. Mirror 18 is constructed and operative to move together with objective lens 14 in the X- and Y-directions, and mirror 20 is constructed and operative to move together with objective lens 14 and mirror 18 in the X-direction, in order to ensure that light is able to travel along the optical axis of objective lens 14. Mirrors 18 and 20 also reflect light received from the sample, including reflected incident light from illumination unit 22 or autofocus unit 24, or light which results from fluorescence of the sample, along the optical axis of objective lens 14 and away from the sample.

As shown in FIG. 1, apparatus 10 also comprises an autofocus unit 24. Autofocus units per se for focusing non-fluid immersion objectives, viz. objectives that do not use oil or water, are known in the art. For use as shown in FIG. 1, the autofocus is preferably an autofocus unit that is usable in high-resolution, high-throughput microscopy applications, for example the autofocus unit and method described in PCT patent publication WO 03/077008 entitled "Autofocusing method and device" and filed Mar. 13, 2003, or U.S. Pat. No. 7,109,459 of the same title, the contents of both of which are incorporated herein by reference.

In FIG. 1, autofocus unit 24 emits a beam of laser light at a wavelength at which the vehicle carrying the sample(s) is transparent, e.g. 635 nm, which is then reflected by a beam-splitting device (dichroic filter 26) onto the optical axis of objective lens 14, reflects off mirrors 18 and 20 through objective lens 14 and onto the vehicle in the sample holder. It is then reflected back along the same pathway, and reflected by dichroic filter 26 back into the autofocus unit, where it is sensed by a sensor (not shown), and a controller (not shown), programmed to adjust the focus of the objective lens along the Z-axis, if necessary. When the autofocus unit 24 is used with samples containing fluorescent labels, the wavelength of the autofocus light may be chosen so as not to elicit a fluorescent response in the sample, although this is generally not critical, as typically the autofocus process will be completed before the image capture process begins. A similar process can be employed when using e.g. an oil-immersion lens, with certain changes to account for the use of the oil, as will be described in more detail below.

Also shown in FIG. 1 is an illumination unit 22. Illumination unit 22 includes an illumination source (not shown), such as a mercury lamp, LED lamp, a laser, or other suitable radiation source. If necessary, the illumination unit 22 includes collimating optics. In the case where the sample contains one or more fluorescent probes or the like, a suitable beam splitting device is arranged so as to reflect the excitation light onto the optical axis of the objective lens 14. This beam splitting device could be a quad filter 28 that reflects light of the excitation wavelength generated by the illumination unit but allows light of other wavelengths, in particular light generated by fluorescence of fluorescent probes in the sample, to pass through. It will be appreciated that illumination unit 22 may be configured to generate electromagnetic radiation of more than one wavelength, or that more than one illumination unit may be employed in order to generate electromagnetic radiation of more than one wavelength, if for example multiple fluorescent probes are employed in the samples being observed, provided that appropriate beam splitting devices are also employed to ensure reflection of the excitation light onto the optical axis of the objective lens 14 and passage of light of wavelengths of interest, e.g. fluorescent light generated by the fluorescent probes in the samples. Also, it will be appreciated that although FIG. 1 shows the autofocus unit 24 being located between the illumination unit 24 and the objective 14, in principle the positions of illumination unit 22 and autofocus unit 24 could be reversed, provided that appropriate optics are provided to ensure that only light of wavelengths of interest passes through to the image capturing devices 30.

As shown in FIG. 1, light which is either reflected off of or generated by the sample (by fluorescence), or, if the sample is illuminated from the side of upper face 13b, light which is transmitted through the sample, travels along the optical axis of objective lens 14 and passes through dichroic filter 26 and quad filter 28 before being detected by one or more image capturing devices 30. FIG. 1 depicts an arrangement in which three such image capturing devices, viz. three CCD cameras 30, 30' and 30" are present, and in which after passing through beam-splitting devices 26 and 28 but before impinging on the CCD cameras, the light passes through a tube lens 32, reflects off a fold mirror 34 and is split by an RGB prism 36 before passing through emission filters 38, 38' and 38" that filter out all light but that of the emission bands of the fluorescent probes in the sample; in the FIG. 1, emission filter 38 allows passage of red light, emission filter 38' allows passage of green light and emission filter 38" allows passage of blue light. It will be appreciated that prism 36 may be other than an RGB prism and filters 38, 38' and 38" may consequently filter in different ranges of wavelengths.

The operation of the system shown in FIG. 1 is controlled by one or more controllers (not shown) which are collectively programmed to control the operation of the autofocus unit, the illumination unit, and the movement of the XYZ scanner. An analysis unit (not shown) for analyzing the images obtained by the image capturing device(s), which may also be part of the one or more controllers or may be a separate unit, may also be provided, and may be configured to provide feedback to the one or more controllers. In addition, as will be appreciated by those skilled in the art, input and/or output devices, such as a keyboard, optical or magnetic storage reader and/or writer, printer, and display device such as a plasma or LCD display, as well as storage devices, may also be provided.

It will be appreciated by those skilled in the art that variations on the arrangement shown in FIG. 1 may be employed in accordance with embodiments of the invention; at least one such variation, for implementing an auto-focus method when using an oil-immersion lens, is described below.

An XYZ scanner such as is shown in FIG. 1 can be incorporated into an apparatus in accordance with embodiments of the invention. See, e.g., FIG. 2, which shows in isometric view portions of an apparatus 810 constructed and operative such that it can be adapted for use in accordance with embodiments of the invention. Apparatus 810 contains a sample holder 812 which holds a 96-well sample plate 813. Sample plate 813 lies in a plane perpendicular to the optical axis of objective lens 814, which is part of scanner 816 and moveable in three mutually orthogonal directions, viz. the X, Y and Z directions. Scanner 816 includes mirror 818 mounted in mirror mount 819 which is moveable in the X and Y directions, and mirror 820 mounted in mirror mount 821 which is moveable in the X direction.

Figure 2:
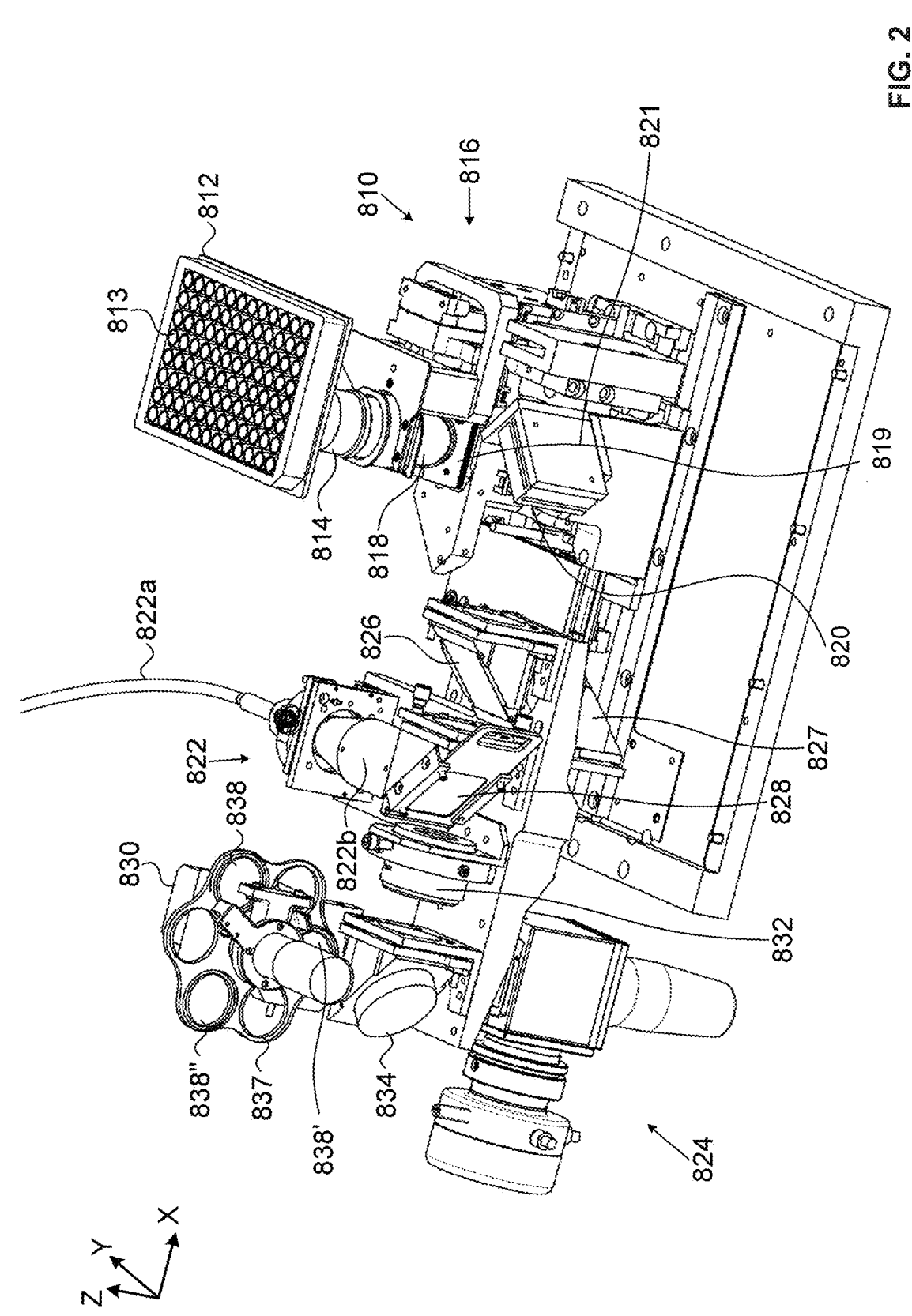
FIG. 2 is an isometric view of an apparatus constructed and operative to be adapted for use in accordance with an embodiment of the present invention.

FIG. 2 also shows autofocus unit 824 and a mirror 827 which directs light from the autofocus unit to dichroic filter 826 and vice versa; dichroic filter 826 directs light from autofocus unit 824 to the optical axis of objective lens 814. Also shown is part of an illumination unit 822, including a bundle of fiber optic cables 822a and collimation optics 822b, and quad filter 828, arranged to reflect light from the illumination unit to the optical axis of objective lens 814. Light that reflects off of samples or is generated by the fluorescence in the sample plate (e.g. the fluorescence of fluorescent probes) and that is not filtered out by quad filter 828 is then focused by tube lens 832 and reflected by fold mirror 834 to camera 830; filter wheel 837 contains filters 838, 838' and 838" which can be selected to filter light entering camera 830.

Figure 3:
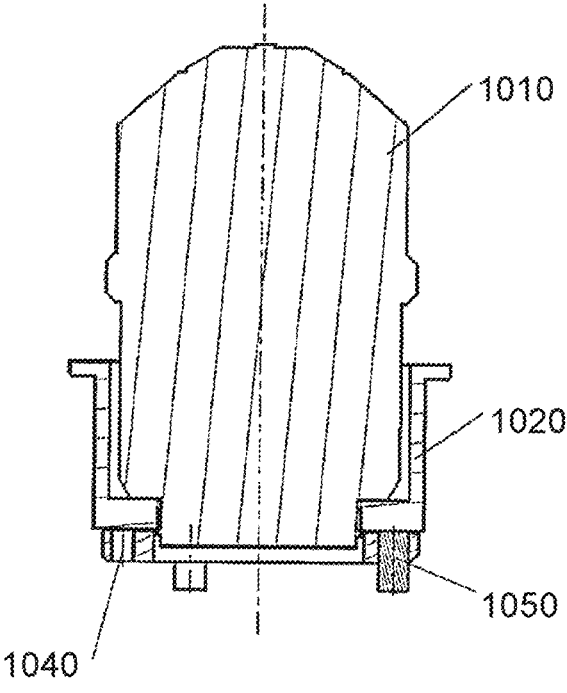
FIG. 3 is a cross-sectional view of an objective lens mounted on an objective lens holder and attached to a kinematic base, useable in accordance with an embodiment of the present invention.
Figure 4:
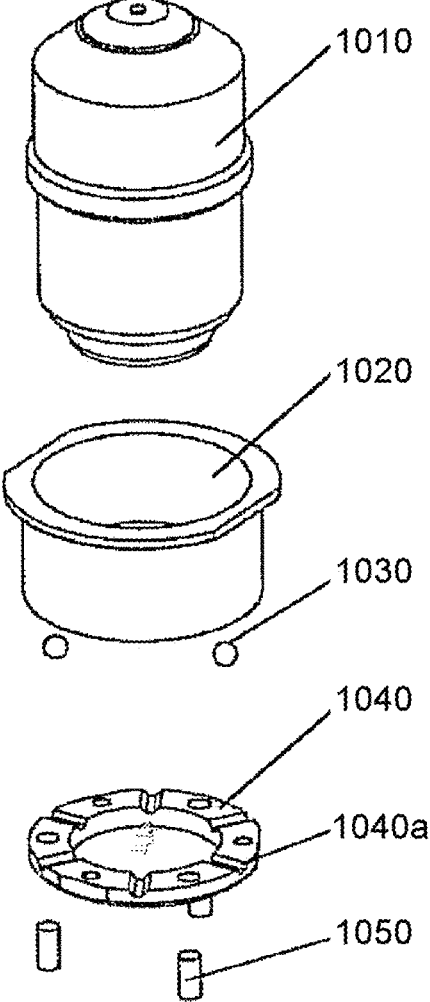
FIG. 4 is an exploded isometric view from above of the components in FIG. 3.
Figure 5:
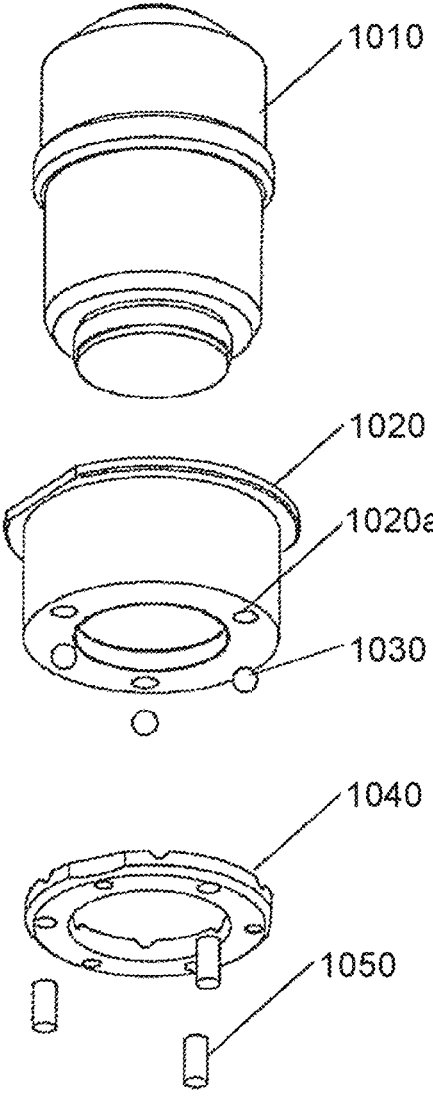
FIG. 5 is an exploded isometric view from below of the components in FIG. 3.
Figure 6:
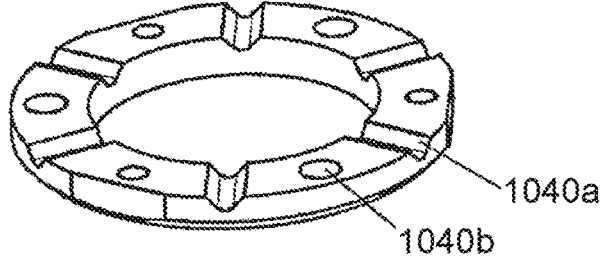
FIG. 6 is an isometric view of the kinematic of FIGS. 4 and 5.
Figure 7:
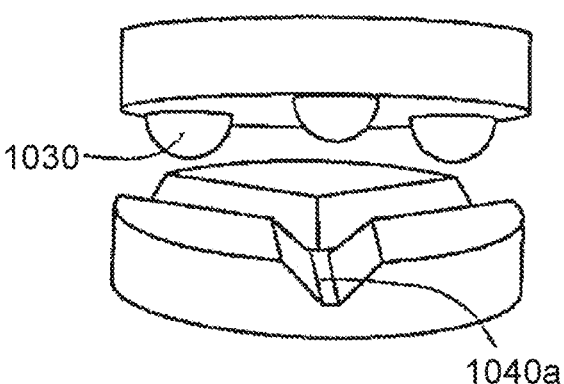
FIG. 7 shows how the lower portion of the objective lens unit of FIGS. 3-5 fits into the V-shaped grooves of the kinematic base of FIG. 6.
Figure 8:
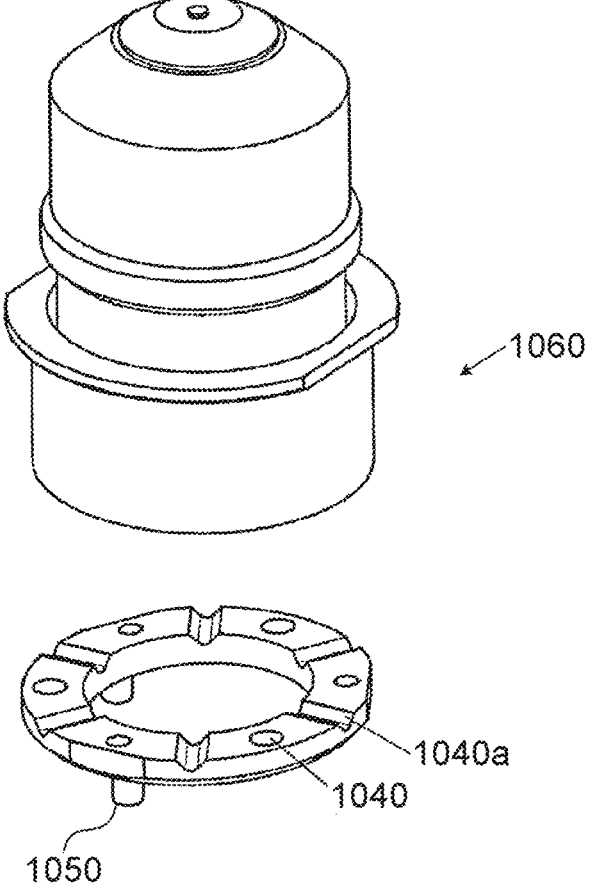
FIGS. 8 and 9 are isometric views from above and below, respectively, showing an objective lens mounted in an objective lens holder and a kinematic base having magnets attached thereto.
Figure 9:
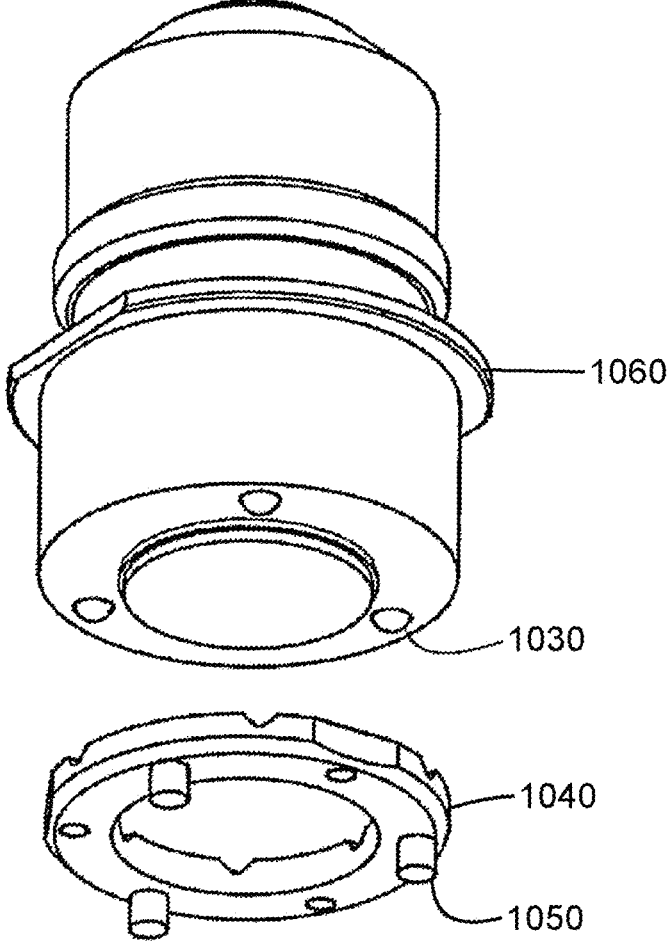

In accordance with some embodiments of the present invention, the apparatus is fitted with a coupling mechanism to facilitate the changing of objective lenses, although it will be appreciated that this mechanism can be employed in other optical instruments. Reference is now made to FIGS. 3-9, which show one embodiment of such a mechanism. As shown in FIGS. 3, 8 and 9, an objective lens 1010 is permanently mounted on objective lens base 1020. Objective lens 1010 and objective lens base 1020 together form objective unit 1060. Objective unit 1060 is attached to a kinematic base 1040. In accordance with some embodiments of the invention, kinematic base 1040 may be mounted permanently on top of the Z-axis component of the XYZ scanner, so that objective unit 1060 containing an objective lens such as lens 338 may be brought to rest thereupon, as will presently be described; alternatively; the kinematic base may be formed as part of the top of the Z-axis component of the XYZ scanner.

As will presently be described, the attachment between the objective lens base 1020 and the kinematic base 1040, as depicted in the figures, uses a specific kinematic mount configuration, which provides positioning precision in the range of 50 nanometers or better. Objective lens base 1020 contains a plurality of coupling balls 1030 (three such balls are depicted in FIGS. 3-9) and is machined such that after being set in position, there is high accuracy in the spatial position of coupling balls 1030 relative to the optical axis of objective lens 1010. Coupling balls 1030 are of high stiffness (e.g. hardness of 53-58 RC SS or more) and of suitable diameter, e.g. 3-3.5 mm. Each of coupling balls 1030 is held in place in one of holes 1020a formed in the lower surface of objective lens base 1020 such that 30-40% of the ball diameter protrudes downwardly out of the lower surface of objective base 1020. Holes 1020a may penetrate only partially into objective lens base 1020, whereby to form a cylinder having one end closed, or they may run completely through the bottom of objective lens base 1020. Each of holes 1020a has an interference diameter tolerance with the coupling ball 1030 placed therein, whereby to hold the ball firmly in place. Objective lens base 1020 is made of ferromagnetic steel such as 17-4 PH.

As depicted in the figures, kinematic base 1040 is of generally annular ring shape, and has several indentations in the form of V-shaped grooves 1040a formed in the upper side thereof. The spacing of coupling balls 1030 and grooves 1040a is such that the coupling balls fit into three of the grooves, as shown in simplified form in FIG. 7. Kinematic base 1040 may also be built of high performance ferromagnetic steel such as 17-4 PH, which is thermally treated to reach a surface hardness of 39 RC or higher, so that kinematic base 1040 will maintain attachment precision over cycling load and unload operations of the lens unit 1060. To ensure that kinematic base 1040 has the required surface hardness, the following manufacturing process is observed: (a) manufacture parts to final dimensions leaving 50 microns for the final groove 1040*a* grinding process; (b) perform thermal hardening process; (c) grind the V groove 1040*a* to the final dimensions.

As shown in the figures, kinematic base 1040 is formed with three holes 1040*b* therethrough, spaced approximately evenly around the base. A magnet 1050 is inserted into each hole 1040*b* and glued in place. Together magnets 1050 cause a magnetic attachment force with the objective unit 1060 when the parts are in close proximity. This attachment force both positions the objective in place, by balancing the attachment forces applied on the kinematic coupling, as well as maintains the objective unit 1060 in place while the optical system moves at high acceleration. It will be appreciated that the magnets need not necessarily come into contact with the object base 1060 nor, as can be see e.g. in FIG. 9, even protrude through holes 1040*b*. Thus, in this application, when it is stated that such magnets are "installed within" a surface that is opposite a ferromagnetic surface, the magnets may protrude out from, or be embedded within or even below the surface that they are "installed within", since magnetic attractive force operates without the need for direct physical contact.

Although a particular embodiment of the coupling mechanism has been shown in FIGS. 3-9, it will be appreciated that variations on what is shown therein are possible. This is because the collective effect of the balls 1030 and grooves 1040*a* is to both precisely locate the objective unit 1060 in the XY plane and to restrict the motion of the objective unit 1060 in the XY-plane and the negative Z-direction, and the addition of the magnetic force restricts motion of the objective unit in the positive Z direction, and these effects can in principle be achieved with other arrangements. Thus, for example, more or fewer holes 1040*b* and, accordingly, more or fewer magnets could be employed, and the magnets could installed within the bottom of the lens objective unit as well as the kinematic base, or the magnets could be installed exclusively within the bottom of the lens objective unit. Similarly, the positions of the indentations and balls could be reversed, so that the bottom of the objective unit 1060 contains indentations, such as grooves, and the upper surface of the kinematic base has balls protruding therefrom, or both the objective unit and the kinematic base could have indentations and balls, or the kinematic base could have two grooves and a protrusion and the bottom of objective unit 1060 could have two corresponding protrusions and a corresponding groove.

Moreover, the indentations may be in a shape other than V-shaped grooves, for example one or more of the indentations could be in the shape of a well that provides three points of contact for a ball 1030 resting therein rather than two points of contact as in a V-shaped groove. One such well, in combination with a single V-shaped groove and the surface of the kinematic base and appropriately positioned magnets of sufficient strength, could have the same effect as three V-shaped grooves. Furthermore, protrusions other than a ball shape that fit into those indentations may be employed. Thus, for example, persons skilled in the art will appreciate that although in the figures a plurality of balls 1030 are shown held in holes, other construction arrangements are possible, for example round-headed nails may be used.

The relative positions of the indentations may also differ from what is shown in FIGS. 3-9: the indentations may be arranged so that there is only one way for the protrusions from the opposite piece to fit therein, thus providing only a single way for the objective unit to set in place on the kinematic base. Alternatively, three protrusions may be used (to ensure that the piece with the protrusions sits on a plane), for example as described above with respect to the objective lens unit, but instead of three or six V-shaped grooves being presented in the opposite piece (e.g. as shown above with respect to the kinematic base), a larger number of evenly-spaced, radially-oriented V-shaped grooves may be employed, such as 9 or 12, to facilitate easier placement of the lens unit, for example when used in an objective lens changer like the lens changer described below.

In addition, although FIGS. 3-9 show an objective unit 1060 which is formed from an objective lens 1010 and objective lens base 1020, it will be appreciated that objective lens 1010 may be formed in a way that obviates the need for objective lens base 1020, for example if the bottom of objective lens 1010 is made from a ferromagnetic material and machined so as to have coupling balls 1030 protruding therefrom. It will be appreciated that where it is stated in the description or claims that the objective lens has a surface "associated therewith", such surface may be a surface of the objective lens assembly itself, or it may be a surface of a lens holder or base on which the objective lens is mounted, such as is shown in FIGS. 3-9.

Figure 10:
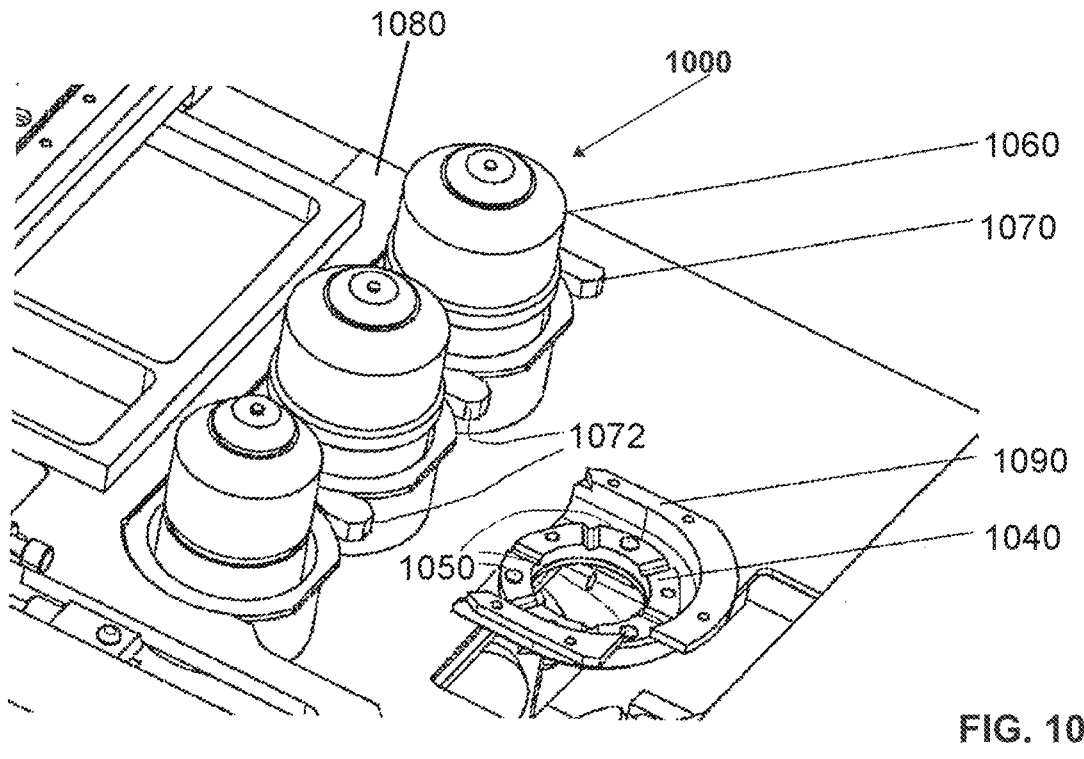
FIGS. 10 and 11 show how objective lenses may be stored and changed, in accordance with embodiments of the present invention.
Figure 11:
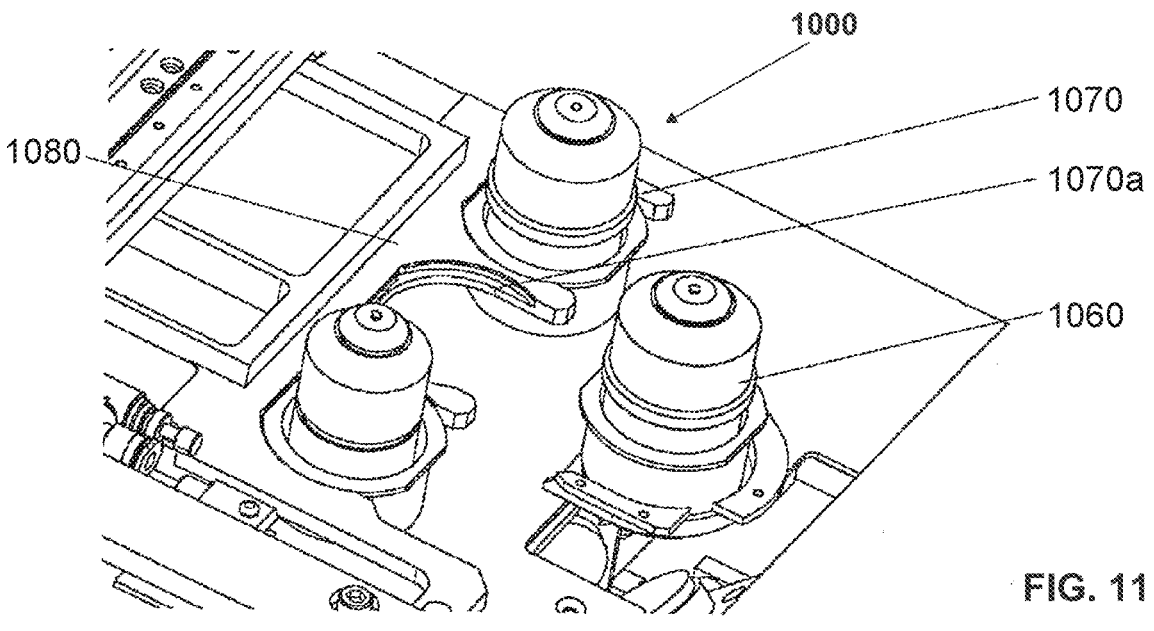

The coupling mechanism described above enables an objective lens to repeatedly be inserted and removed into the optical device, with sufficient accuracy to enable high precision observations to be obtained using the objective lens. Consequently, the mechanism described herein facilitates the use of a multiplicity of objective lenses in the optical device, since lenses can be swapped in and out; in the case of the device shown in the figures, this can be accomplished without burdening the XYZ scanner with the weight of the full complement of objective lenses, thus facilitating higher accelerations than could be employed, and quicker settling times than could be achieved, if the XYZ scanner were to bear the weight of the entire set of objective lenses. Instead, the objective lenses may be stored elsewhere in the apparatus and exchanged as necessary when it is desired to change magnification. Additionally, while turrets bearing multiple objectives are known, the objectives in such turrets are arranged so that the objective in use is aligned with the focal path along the Z-axis, but the objectives not in use are at an angle relative to the Z-axis, and thus switching out one oil immersion lens for another would result in loss of oil as the turret is rotated and the lens is moved to an angle away from the vertical. Thus, as shown in FIGS. 10 and 11, a lens changing subassembly 1000 includes a magazine 1080 which holds a plurality of objective units 1060 in a plurality of stations 1070. Each objective unit 1060 in magazine 1080 is roughly aligned with the Z-axis of XYZ scanner 1090 and roughly perpendicular to the plane of kinematic base 1040, which is attached to the upper portion of XYZ scanner 1090, and furthermore the ball couplings 1030 protruding from the bottom of each objective unit 1060 are positioned so that they will engage the V-shaped grooves 1040*a* in the kinematic base when the XYZ scanner is raised to contact the objective unit, as described below. Each station 1070 includes a pair of arms 1072, so that each pair of adjacent arms can hold an objective unit 1060. Although as shown in FIGS. 10 and 11, magazine 1080 holds three objective units 1060, in principle an optical device may be designed to hold more such objective units.

To illustrate how the coupling mechanism may be employed to change objective lenses, assume that scanner

1090 initially has no objective unit attached thereto, as depicted in FIG. 10, and that at least one objective unit 1060 is loaded on one station 1070 of magazine 1080. Scanner 1090 is first moved to a Z-position which is sufficiently low to enable it to move under a selected objective unit 1060. The XYZ stage is then moved in the XY plane to a position in which the optical axis of the selected objective lens resting in station 1070 is roughly aligned with the optical axis that will be required of the objective lens once positioned for use on XYZ scanner 1090. The Z stage is then moved upwardly so as to come into contact with the lower portion of selected objective unit 1060. This results in the coupling balls 1030 resting in grooves 1040*a*. The proximity of the magnets 1050 to the bottom of objective unit 1060, which is made of ferromagnetic material and thus attracted to the magnets, results in coupling balls 1030 settling in the grooves and being held there. As depicted in FIGS. 3-11, when the coupling balls and the V-shaped grooves are machined with sufficient precision (e.g. within 50 nm tolerance), the use of three coupling balls at approximately 120° separation and V-shaped grooves oriented radially from the center of the kinematic base and into which the coupling balls fit results in the optical axis of the objective lens being set with sufficient accuracy to enable use of the objective lens without further calibration. The Z stage is moved further upward, sufficiently to lift the objective unit 1060 off arms 1072. The XY stage may then be moved out of the station 1070. The optical system is now ready to operate using the selected objective.

A similar process is repeated when changing from the first objective to a second one. The scanner is moved to an open station 1070 and, operating in the reverse sequence from that described above, places the first objective unit 1060 in the station 1070. The XYZ stage then moves to a different station of magazine 1080 and loads the second objective in a manner analogous to that described above for the first objective.

It will be understood that the movements of the XYZ scanner may be automated, effected by appropriate motors and controlled by a microprocessor that has been programmed for such purpose.

It will also be appreciated that although in FIGS. 10 and 11, an XYZ optical scanner 1090 is shown as the device for facilitating transfer of an objective on and off the optical system, the method described is not restricted to use with an XYZ optical scanner and can be used in any system having moving optical elements controlled by a combination of motors, encoders, sensors, servo controller or other automation elements. Furthermore, in cases in which the moving optical system cannot reach all objective units, a secondary motion system (not shown) may be employed to move the magazine 1080 so that the particular lens in question is in a position that is accessible to the optical system.

The lens changing subassembly 1000, described herein with respect to FIGS. 3-11, is particularly advantageous for conducting automated high-content or high-throughput screening of a biological sample using a liquid immersion objective lens. However, it will be appreciated that in some embodiments of the invention, the apparatus or device does not have a lens changing subassembly, using only a single objective, the device or apparatus being large enough in the X- and/or Y-direction that (a) the objective lens can be moved away from the sample holder along the Z axis while maintaining its three dimensional orientation (e.g. in terms of pitch, roll, and yaw), and moved in the XY plane to an oil-replenishment position, then after replenishment of the oil returned to the same place in the XY plane, and, after re-focusing in the Z-direction, scanning continued from where it was interrupted, (b) while maintaining its orientation in the XYZ coordinate space, the sample holder can be moved from its stationary position for scanning, in order to facilitate replenishment of the oil, and then moved back to the same place from which scanning was interrupted, so that, after re-focusing of the objective in the Z-direction, scanning can be continued from where it was interrupted, or (c) a combination of both (a) and (b).

One of the challenges with liquid immersion scanning of biological samples is the need to periodically replenish the liquid on the objective lens. This is particularly important when scanning in a setting where the objective moves relative to the sample, while close to, or in contact with, a surface of the sample holder (e.g. multi-well plate, petri dish, or sample bearing slide), because the relative motion between the objective and the sample holder results in spreading of the immersion liquid, to the point where the layer of immersion liquid is insufficient for properly observing the sample. As such, scanning is limited to the distance that the objective can move before the immersion liquid must be replenished.

As noted in the background discussion above, prior art systems for the replenishment of oil suffer from various drawbacks, e.g. they require the placement of additional items on the objective itself, thus adding to the weight of the objective lens assembly, as well as increasing its effective size, which can reduce the area of the sample that can be scanned, and limit the degree to which the lens itself can be brought close to the sample holder. Additionally, when this is done manually, a human user must stop the operation of the system and manually replenish the immersion liquid on the objective lens, either manually, or with the assistance of a specially-designed apparatus. This greatly delays the operation of the system, and requires periodic attention of the human operator. As such, it is also more error prone. Additionally, the need for manual replenishing of the immersion liquid limits, or prevents, conducting of large screening sessions with many locations, disposed at long distances from one another, being scanned.

Another challenge in manual application of immersion oil to the objective, is that the human operator may apply too little oil, resulting in frequent stopping of the microscopy system. Alternatively, the human operator may apply too much oil, causing the oil to spill off the objective unit during motion thereof, for example from a location at which the human operator applies the immersion liquid to the scanning location. An additional issue is that, in order to avoid moving the lens from its in-focus position, hitherto it has been necessary to effect oil replenishment while leaving the objective in its location adjacent to the surface of the sample holder (e.g. close to the bottom of a multi-well plate), leaving little room in which to maneuver in order to add oil to the lens.

In accordance with embodiments of the present invention, as described hereinbelow with respect to FIGS. 12-19B, a lens changing subassembly forming part of the microscopy system ensures that there is a fixed position, to which the objective lens can be automatically moved, and in which the objective lens will not be disposed beneath the sample. The existence of such a fixed position facilitates the construction of the inventive immersion liquid loading subassembly, discussed hereinbelow, directly above a predetermined position of the magazine of the lens changing assembly. As described hereinbelow and according to embodiments of the present invention, in use, the immersion liquid objective is periodically moved to the predetermined position of the magazine of the lens changing assembly, and oil is automatically applied onto the objective from the liquid loading subassembly, following which the objective lens is automatically returned, by the system, to the scanning position in order to continue the scanning process.

It is appreciated that the immersion liquid subassembly and processes of use thereof, described hereinbelow, are suitable for use with any suitable immersion liquid, such as synthetic hydrocarbon-based oil, water, glycerol, silicon oil, and the like, and the scope of the disclosure herein should be construed to include all types of immersion liquids suitable for microscopy, and specifically for microscopy of biological samples. However, for brevity and for clarity, the following discussion relates to a synthetic hydrocarbon-based immersion oil, i.e. to an oil objective, loading of immersion oil, and the like.

Figure 12:
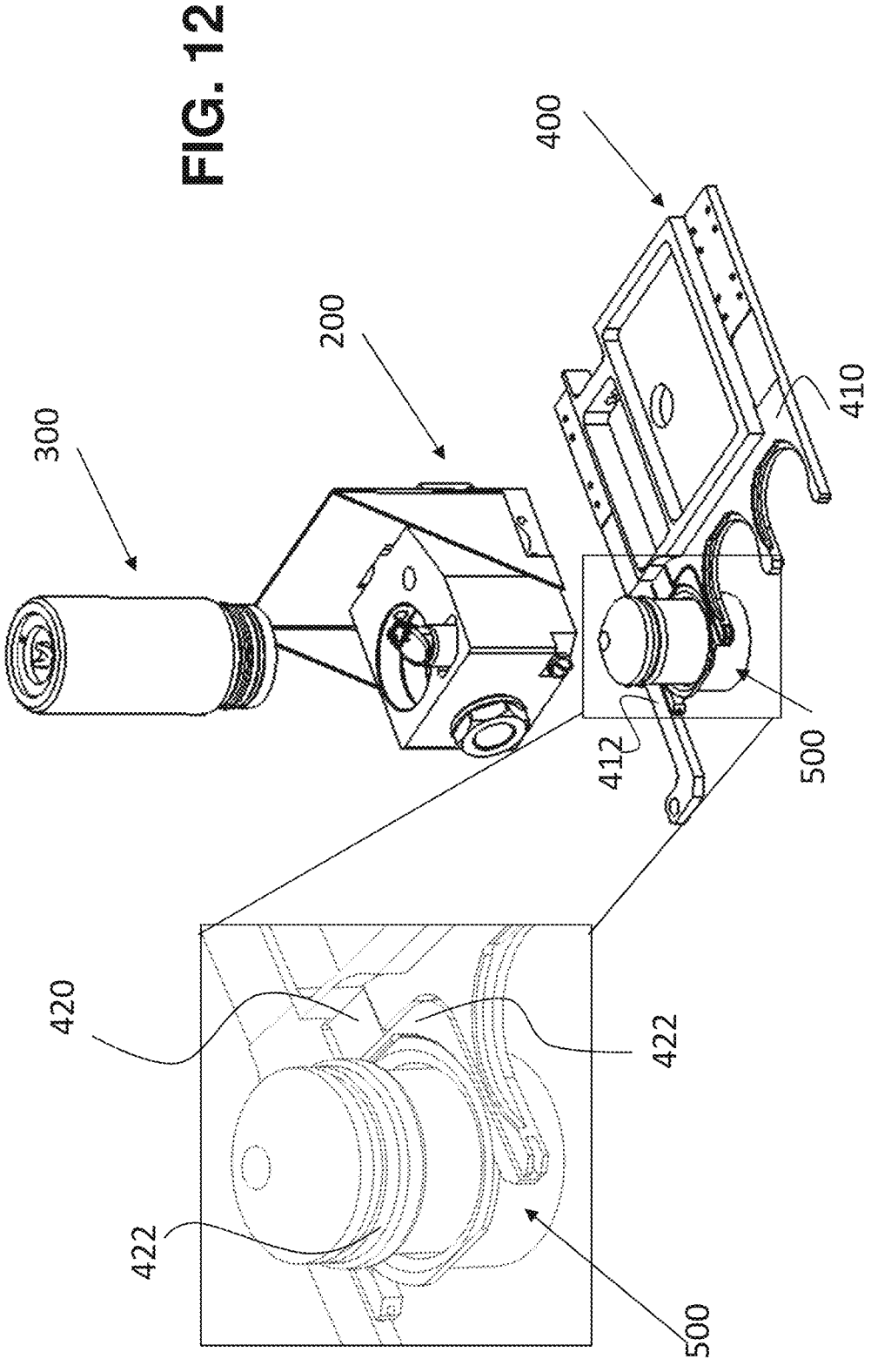
FIG. 12 is a partially exploded view of an oil loading subassembly, having an immersion oil cartridge, disposed above a lens changing subassembly, in accordance with embodiments of the present invention.

Reference is now made to FIG. 12, which is a partially exploded view of an oil loading subassembly 200, having an immersion oil cartridge 300, disposed above a lens changing subassembly 400, in accordance with embodiments of the invention. Lens changing subassembly 400 is substantially similar, in construction and operation, to lens changing subassembly 1000 described hereinabove. As seen, lens changing subassembly 400 includes a lens holding magazine 410 having a plurality of positions for holding objective lenses, here shown as three positions. Leftmost position 412 of magazine 410 is illustrated as temporarily housing an oil immersion objective unit 500, similar to the objective units described hereinabove with respect to FIGS. 3-9. Leftmost position 412 is predetermined to be the oil-loading position, such that an oil outlet of oil loading subassembly 200 is disposed above oil-loading position 412, in a position to drip oil onto an objective lens of objective unit 500. Immersion oil cartridge 300, which is described in further detail hereinbelow, is positioned above a corresponding well in oil loading subassembly 200, and is adapted to be inserted thereinto, as explained herein. It will be appreciated that because position 412 is reserved for oil loading, lens changing subassembly 400 as shown may effect changing between two lenses, which may be stored in the other two positions to the right of position 412. It will also be appreciated that lens changing subassembly 400 may be formed with additional positions to facilitate changing between a larger number of lenses. Alternatively, as mentioned previously, in principle there need not be a lens changing subassembly, e.g. if there is enough room in the apparatus to provide an oil-loading position sufficiently far from the sample so as to not limit scanning to only a portion of the sample.

Oil loading position 412 is selected such that the position is always outside of the scanning path of the lens scanning a sample.

In some embodiments, oil-loading position 412 of lens changing subassembly 400 may include a weighing mechanism, for determining the weight of objective unit 500 when it is disposed in that position. For example, the weighing mechanism can obtain a baseline weight, or be tared, when the objective unit 500 is placed in oil-loading position 412. As such, the weighing mechanism can identify a change in weight of the objective unit, for example following application of the immersion oil thereonto. Based on the properties of the immersion oil, a controller associated with the weighing mechanism can determine how much immersion oil was applied to the objective unit 500, and whether or not additional application of oil is required.

The weighing mechanism may be any suitable mechanism for weighing the objective unit 500. In some embodiments, the weighing mechanism may include a flexible leaf 420, attached to a frame structure 402 of lens changing subassembly 400. A pair of flexible arms 422 extend from leaf 420, the arms being disposed about objective unit 500, when the objective unit is in the position 412, such that objective unit 500 rests against arms 422. Attached to one or more surfaces of each arm 422, for example in a free region of the arm but, in some embodiments, near leaf 420 and/or near frame structure 402, there is a thin, flat strain gauge (not explicitly shown). Each of the strain gauges is electrically connected (e.g. by thin wires, not shown) to a thin, flat electronic card (not explicitly shown) located below arms 422. The electronic card(s) may be positioned so as to minimize the length of the connections between the strain gauges and the card(s). The electronic card(s) are electrically coupled to a processor (not shown). It will be appreciated that use of strain gauges and electronic cards allows for correlation of the deflection of the arms 422 to a change in electrical resistance in a circuit, for example measured using a Wheatstone Bridge, which is also located on the electronic card, allowing calculation of the change in the weight of the objective unit 500, and thus of the mass of immersion oil applied to the objective lens. As such, arms 422 together with the strain gauge(s) form a signal provider, for providing a signal indicative of an amount of immersion oil applied to the objective unit. If the density of the immersion oil is known, this facilitates computation of the volume of immersion oil added. For example, it is possible to iteratively calculate the amount of immersion oil applied to the objective lens after each application thereof, and therefore to identify in real time, whether or not a sufficient volume of immersion oil has been applied. As such, the controller associated with the weighing mechanism may be functionally associated with an oil pump of oil loading subassembly 200, described hereinbelow, such that operation of the pump to apply immersion oil is started and stopped based on information relating to the weight of the objective unit.

In some embodiments, an overflow tray (not explicitly shown) may be disposed beneath magazine 410, or at least beneath oil loading position 412, to collect any overflow of immersion oil dripped from oil loading subassembly 200 onto objective unit 500, or which may spill while no objective is disposed in the oil loading position. It will also be appreciated that the presence of a holder for the lens, such as objective lens base 1020 in FIG. 5, may provide a trap for oil if it runs off the objective lens.

Alternatively, the amount of oil added can be calculated by calibrating the average amount of oil in a drop of oil released from the oil loading subassembly, and the number of drops applied to the lens can be counted to calculate the amount of oil added, for example by means of a beam of light connected to a sensor that provides a signal each time a drop interrupts the beam; or by means of a camera coupled to an automatic image analysis program that detects and counts falling oil drops. Alternatively, the amount of oil removed from the oil reservoir can be calculated each time the oil on the objective is replenished, e.g. by measuring the change in weight in the reservoir, to calculate the amount of oil applied to the lens.

Whether the amount of oil added is determined by direct measurement of weight, or by counting the number of drops, the total amount of oil added, and thus the total amount of oil remaining in the assembly for further application to a lens, can be calculated and optionally displayed on a screen or other output device.

Reference is now made to FIG. 13, which is an exploded view illustration of oil loading subassembly 200, in accordance with embodiments of the invention, and to FIGS. 14A, 14B, 14C, and 14D, which are, respectively, a perspective view, a planar front view, a planar side view, and a sectional view of oil loading subassembly 200 when constructed and having immersion oil cartridge 300 disposed therein. Such a cartridge may be made of any suitable material that does not significantly interact with the oil or other liquid contained therein or lead to degradation thereof. In the embodiments shown in FIGS. 13-18B, the cartridge is preferably made of metal, such as aluminum. In the embodiments shown in FIGS. 24-26B, the cartridge is preferable made of plastic.

As seen, oil loading subassembly 200 includes a main body portion 210 having a central oil basin 212 in fluid communication with an oil viewing opening 214, and a pump-seat bore 216, terminating in a pump inlet conduit 217 (see FIG. 14D). As seen in FIG. 14D, an oil flow conduit 218 extends from the base of oil basin 212 and adjacent pump inlet conduit 217, and terminates at an edge of main body portion 210, where the oil flow conduit is sealed by a stopper 220. An observation window 222 is disposed within, and seals, oil viewing opening 214. As seen clearly in FIG. 14B, observation window 222 includes a generally circular transparent portion 224, allowing an operator to observe the oil level in oil loading subassembly 200, and to determine when immersion oil cartridge 300 must be replaced, as explained in further detail hereinbelow. In a variation on this, the window may be provided with a cover to keep light out of the window when the user is not directly observing the oil level; or the oil loading subassembly 200 can be provided with neither viewing opening 214 nor window 222.

A cartridge puncturing element 230 is seated within central oil basin 212, and is attached thereto by fasteners 232, such as screws or bolts. However, fasteners 232 may be replaced by any other suitable attachment mechanism, such as soldering, adhesion, and the like. Cartridge puncturing element 230 includes a base 234 and a puncturing pin 236, having a hollow channel 238 extending longitudinally therethrough, the channel including a bore 239 (see FIGS. 15B-15C) and terminating in a sharp tip. When immersion oil cartridge 300 is installed in central oil basin 212, as shown in FIGS. 14A-14D, hollow channel 238 is in fluid communication with central oil basin 212 as well as with oil flow conduit 218 (see FIGS. 14D and 16A)

A diaphragm pump 250 is disposed within pump-seat bore 216, such that an inlet 252 thereof is seated within pump inlet conduit 217, and an outlet conduit 254 thereof extends downwardly out of main body portion 210. Diaphragm pump 250 is adapted to aspirate oil from oil flow conduit 218, through outlet conduit 254, onto an item disposed beneath the outlet conduit, which, in use, is an immersion oil objective lens.

Oil loading subassembly 200 further include a base mount 260, mounted onto a bottom side of main body portion 210, and adapted for attachment of oil loading subassembly 200 to other components of the microscopy system, above the lens changing subassembly 400. A back mount 265 is mounted to main body portion 210, rearwardly of central oil basin 212. Both base mount 260 and back mount 265 may be connected to main body portion 210 by fasteners 268, such as screws, bolts, and the like. However, any other suitable way of connection, such as adhering, soldering, and the like, is considered within the scope of the invention.

Reference is now made to FIGS. 15A, 15B, and 15C, which are sectional illustrations of steps of insertion of immersion oil cartridge 300 into oil loading subassembly 200. As seen in FIG. 15A, immersion oil cartridge 300 includes a housing 301 formed of a generally cylindrical wall portion 302 defining a hollow 304 having a first internal diameter, and terminating at a lip 306. At one end thereof, distal to lip 306, wall portion 302 extends to a generally transverse shoulder 310, which narrows the internal diameter of the wall portion to form a generally cylindrical hollow neck portion 312, having a second internal diameter. The second internal diameter of neck portion 312 may be smaller than the first internal diameter of wall portion 302. At an end of neck portion 312, distal to shoulder 310, the thickness of the wall of neck portion 312 is reduced, defining a first chamber having a third internal diameter, which is greater than the second internal diameter. The first chamber includes an annular shoulder 316, and terminates at a lip 318. On an exterior surface thereof, neck portion includes snap fit engagement protrusions and/or grooves 319, adapted for snap fit engagement with corresponding grooves and/or protrusions 219 in the internal circumference of central oil basin 212.

A generally annular transverse wall 320 extends radially inward from wall portion 302 at a location disposed between lip 306 and neck portion 312, significantly closer to lip 306 than to neck portion 312. Annular transverse wall 320 terminates radially inwardly in a cowl portion 322, which is substantially concentric with wall portion 302. A volume between annular transverse wall 320 and lip 306 defines a second chamber. A fluid flow path exists, between the first chamber and the second chamber, via the hollow defined by neck portion 312, the hollow defined by wall portion 302, and the hollow of cowl portion 322.

A puncturing piston 330 is disposed within housing 301. Puncturing piston 330 includes a generally circular base 332 from which extends a central shaft 334, which terminates at a pointed edge 336, which may include one or more points. At an upper portion of shaft 334, close to edge 336, shaft 334 defines a hollow 338, and includes one or more bores 340 connecting the hollow 338 with an environment surrounding shaft 334. The remainder of shaft 334 is non-hollow.

In the initial, closed, operative orientation of immersion oil cartridge 300, illustrated in FIG. 15A, a first seal 350, which may be a material that is inert to the oil, such as nylon or aluminum foil, is disposed within the first chamber, and engaging annular shoulder 316. Base 332 of puncturing piston 330 is disposed within the hollow of neck portion 312 and engages first seal 350, such that shaft 334 extends through the hollows defined by neck portion 312, wall portion 302, and cowl portion 322. Pointed edge 336 does not extend beyond an end of annular transverse wall 320, and may be flush therewith. A second seal 352, which may be a material that is inert to the oil, such as nylon or aluminum foil, is disposed in the second chamber, and engages transverse wall 320. As such, in the closed operative orientation of immersion oil cartridge 300, the cartridge is sealed, with oil disposed therein (for clarity, the oil is not shown in FIG. 15A).

In order to use the immersion oil in cartridge 300, the user moves the cartridge in the direction of arrow 360, such that first seal 350 faces toward central oil basin 212 and puncturing element 230 disposed therein.

Turning to FIG. 15B, it is seen that as the user pushes the oil immersion cartridge 300 into central oil basin 212, puncturing element 230 thereof, and particularly puncturing pin 236, punctures through first seal 350, and pushes base 332 of puncturing piston 330 toward second seal 352. Consequently, the entirety of puncturing piston 330 moves toward wall portion 320, in the direction of arrow 362, and pointed edge 336 of shaft 334 punctures through second seal 352. Snap fit engagement protrusions and/or grooves 319 of oil immersion cartridge 300 engage corresponding grooves and/or protrusions 219 in the internal circumference of central oil basin 212, ensuring that the cartridge is snap fit within the oil well. In this orientation, the seals 350 and 352 are punctured, air can flow into oil immersion cartridge 300, and oil can flow out of the cartridge, as shown in FIG. 15C. As such, oil flows out of the cartridge, around the base 332 of puncturing piston 330, and through channel 238 and bore 239 of puncturing element 230, into central oil basin 212.

Reference is now additionally made to FIGS. 16A and 16B, which are sectional illustrations illustrating the oil flow path within oil loading subassembly 200. As seen, following unsealing of immersion oil cartridge 300 as shown in FIGS. 15A to 15C, oil flows from central oil basin 212, via oil flow conduit 218 to pump inlet conduit 217. It will be appreciated that in order to reduce the likelihood of dust or other material contaminating the oil, oil cartridge 300 may be left in place after it has been emplaced and punctured to release the oil into basin 212, or the apparatus may be provided with a cover (not shown) that covers basin 212 when oil cartridge 300 is removed.

Operation of diaphragm pump 250, for example in response to an input or a signal received from a controller, causes the pump to draw oil thereinto via inlet 252 seated in pump inlet conduit 217, as shown in FIG. 16A. The oil drawn into diaphragm pump 250 is then dripped out of the pump via outlet conduit 254 of the pump, as shown in FIG. 16B. In operation, an oil immersion objective unit is disposed beneath outlet conduit 254, such that the oil drips onto the objective lens, as described in further detail hereinbelow.

Reference is now made to FIG. 17, which is a perspective view illustration of lens changing subassembly 400 and oil loading subassembly 200, with an objective unit 500 disposed in immersion oil loading position 412. Reference is additionally made to FIGS. 18A and 18B, which are, respectively, a front view illustration and a side view illustration of loading of immersion oil onto the objective lens in the structure of FIG. 17.

As seen, immersion oil cartridge 300 is installed in oil loading subassembly 200, which is mounted above lens changing subassembly 400. Objective unit 500, including an oil immersion lens 502, is located in oil loading position 412 of lens changing subassembly, such that outlet conduit 254 of diaphragm pump is directly above oil immersion lens 502. As seen in FIG. 18A, upon receipt of a suitable control signal triggering operation of diaphragm pump 250, a drop 504 of immersion oil is emitted from outlet conduit 254 onto immersion lens 502. In some embodiments, the oil drop contains 20-30 μl of oil. The drop remains as a mound 506 on the lens, due to the surface tension of the immersion oil. In some embodiments, lens unit 500 may be raised, for example by motion of lens changing subassembly 200, so that lens 502 is close to the outlet opening of outlet conduit 254. This may ensure that the emitted oil is dripped directly onto the lens, and is not wasted.

In some embodiments, multiple drops of oil may be applied to lens unit 500 at each oil loading occurrence. Once a sufficient amount of oil has been applied to lens unit 500, the lens unit may be returned to its scanning location, for example as described hereinabove with respect to FIGS. 10 and 11, As explained in further detail hereinbelow, the amount of oil dripped onto the lens may be estimated, for example based on the expected spreading of oil in view of motion already carried out by the lens, or may be calculated, for example by a weighing mechanism as described hereinabove.

Reference is now made to FIGS. 19A, 19B, and 19C, which illustrate the spreading of the immersion oil as the objective unit moves relative to a viewing surface, during use of the microscopy system.

As seen in FIGS. 19A and 19B, a multi-well plate 600 is disposed within a plate holder 602. Multi-well plate has a lower surface 604, and a plurality of wells 606, each including a biological sample. An oil immersion lens unit 500 is disposed beneath lower surface 604, and is initially positioned to scan a first sample in well 606a. As seen in the enlarged portion of the figure, at this stage, which is the initial stage after loading immersion oil onto lens unit 500, the drop of oil that was disposed on the lens of lens unit 500 is spread by the close proximity of the lens unit to lower surface 604, forming an oil layer 610. Any excess oil may flow to sloped edges 510 of the objective unit, and may be caught in a circumferential groove 512 at the top portion of the objective unit. The surface tension of the immersion oil ensures that the oil, and excess oil, will remain in engagement with the objective unit on the one side and with the plate on the opposing side. As will be discussed more below, the oil is usually formulated so that it has the same index of refraction as the bottom of the multi-well plate or other sample holding vessel; often that bottom is made of glass. It will be appreciated that in this embodiment and the other embodiments shown herein, the turretless objective lens does not have an annular tray like tray 2b in U.S. Pat. No. 7,852,552 B1 disposed around its circumference to collect excess oil, nor are the devices shown in the drawings herein provided with means for siphoning excess oil from such an annular tray. Indeed, in contrast to embodiments of the device and method described herein, which enable controlled addition of oil to the lens so that collection and siphoning of excess oil is unnecessary, in U.S. Pat. No. 7,852,552 B1 the word "focus" is not mentioned at all, and there is no description of how often oil is replenished or the conditions under which the decision to replenish the oil is made.

FIG. 19B illustrates lens unit 500 after it has moved along plate 600, scanning wells 606b and 606c, and has now reached well 606d. At this stage, the thickness of oil layer 610 is reduced relative to its thickness illustrated in FIG. 19A. This is because the immersion oil has been spread along lower surface 604 of the plate, by the motion of the objective unit. As explained in further detail hereinbelow, a controller associated with the objective unit, such as a controller of the microscopy system or of the XYZ movement discussed hereinabove, may be configured to determine that the motion distance of the objective unit has reached a threshold value, at which point it is expected that the immersion oil will be too thinly spread, and to control operation of the objective unit to return the objective unit to the oil loading position for application of additional oil thereto.

FIG. 19C illustrates five different states of the oil drop, disposed at the top of lens unit 500. As seen, at an initial stage (i), which typically occurs immediately after application of oil to the lens unit, the oil drop forms a dome, based on the surface tension of the oil. In fact, at this time, the oil drop is actually in the shape of a drop.

At (ii), the lens unit approaches the surface 604 of the plate, but is not yet spread along the surface. At this time, the drop is vertically stretched between the lower surface of the plate and the upper surface of the lens unit. This configuration may occur when approaching the plate, or when the lens unit is lowered relative to the plate, during detachment of the oil drop from the plate.

At (iii), the lens unit has come closer to surface 604, such that the oil drop is spread along a portion of the plate surrounding the area of the lens unit. However, the oil is still contained only in the region of the lens unit. In some embodiments, the configuration of the oil drop as shown in (iii) may be at a height equivalent to the initial scanning height, as described hereinbelow with respect to FIGS. 21A and 21B.

Image (iv) shows the configuration of the oil following focusing of the objective, as described in detail hereinbelow, and during scanning of an initial region or well of the plate. As seen, the oil is more spread out relative to (iii), but is still located only above the objective lens, and is substantially concentric thereto. After the lens unit moves, for example to scan another field of the well, or another well, some oil remains on the portion of the plate previously scanned by the objective, and some oil travels with the objective to the new region, resulting in spreading of the oil also to regions not disposed directly above the objective, as shown in (v), where the objective has moved to the right relative to the plate, and the oil now extends above the objective and to the left of the objective.

FIG. 20 is a flow chart outlining a method for scanning a sample using an oil immersion lens, and reloading immersion oil onto the oil immersion lens, in accordance with embodiments of the invention. The following description is provided with respect to plate 600 shown in FIGS. 19A and 19B, which has a lower surface 604, and each well has an upper surface upon which the biological sample is disposed. However, the disclosure is equally relevant for any other sample carrying structure, having a lower surface and an upper surface.

As seen in FIG. 20, at a first setup step 700, the Z-axis location of lower surface 604 of plate 600 is approximated. The approximated value is stored, and will be used as the approximated value of the plate height for scanning of the entire plate. Such an approximation step may be carried out for each individual plate checked, or may be carried out once for a plurality of plates or sample carriers.

In some embodiments, the approximation of the Z-axis location of the lower surface of the plate may be carried out using a quick laser scan, identifying the bottom surface of the plate at several locations of planned scanning. In some other embodiments, multiple focus points, e.g. 3 or 4, may be determined, using laser scanning, for the plate or for a region of the plate, and an approximate plane of the lower surface of the plate is determined based on the multiple focus points.

As explained hereinbelow, the approximated height of the lower surface of the plate is used as a basis for subsequent focusing operations for the plate, which are conducted using a search of a maximal signal of laser beam reflection, as explained herein. There are several ways this initial approximation may be carried out. One option is to be determine the approximate height of the lower surface of the plate using an air objective, and then switching to the oil immersion objective for actual focusing and scanning. Another option is to determine the height on the basis of the structure of the plate and apparatus, knowing that the average distance of the bottom of a particular model plate from a particular manufacturer will be a given distance above the bottom edge of the plate, and knowing the dimensions of the apparatus. In some embodiments, the initial approximation of the height of the lower surface of the plate may be carried out by an oil immersion objective lens having a lower magnification than the oil immersion objective lens used for scanning the sample, and then switching to the higher magnification oil immersion objective lens for actual scanning.

In a second setup step 702, one or more scanning regions of the plate or slide are defined, for example using a user interface, and are provided to a controller controlling the XYZ motion of the objective lens, as described herein. In a third setup step 704, a maximal threshold amount of oil that can be lost by the oil immersion objective lens, prior to replenishing the oil thereon, is determined; this amount can be tracked in accordance with the total movement of the objective, by weight loss, or by oil thickness, as described below. In some embodiments, the system can be programmed to adjust this threshold dynamically after each instance of oil replenishment, in accordance with the amount of oil applied to the lens.

Although setup steps 700, 702, and 704 are described in a specific order in FIG. 20, they may also be carried out in a different order, provided that they occur before scanning of the biological sample is initiated.

At step 706, which also occurs prior to initiation of scanning, the objective unit is placed in the oil loading position of the lens changing assembly, and an initial amount of oil is dripped onto the objective lens from the oil loading subassembly, as described herein. For example, the controller associated with the diaphragm pump provides a signal for the pump to drip immersion oil onto the objective lens, when the objective lens is in the right position.

In some embodiments, the initial amount of oil is greater than subsequent amounts of oil, to be loaded at later stages as described herein.

In some embodiments, the exact amount of oil loaded onto the objective lens is determined using a weighing system as described hereinabove. In some other embodiments, the amount of oil loaded onto the objective is approximated, based on the number of oil drops applied to the objective lens, the volume of each drop of immersion oil aspirated by the pump, which is a known value, and the desired volume of oil to be aspirated.

At step 708, the controller controls XYZ motion of the oil-loaded objective lens to get the lens to the appropriate XY position for scanning, as determined in step 702. When initiating scanning, the XY position is the position at which scanning should begin. Following later iterations of replenishing oil on the objective, as described hereinbelow, the XY position is the XY position at which scanning had stopped in order to replenish the immersion oil, or the next XY position. At step 710, the controller causes raising of the objective lens to a predetermined initial scanning height, typically several microns from the approximate Z-axis location of the lower surface of the plate, as established at step 700. The predetermined height is selected to be close enough to the lower surface of the plate so that the oil drop on the objective lens is spread onto the bottom surface of the plate, as shown in FIG. 19A.

The distance from the plate at which the objective lens is in focus, with respect to the sample, is automatically calculated at step 712, for example using the method described hereinbelow with respect to FIG. 21, and the objective is moved to the focus distance. Once the objective lens is at the established focus distance, scanning of the sample begins, at step 714.

During the scanning, the objective lens is moved relative to the sample, or to plate 600, between different positions, as described hereinabove with respect to FIGS. 19A and 19B. The distance traversed by the objective lens is tracked, for example by a controller associated therewith, including both movement when the oiled objective is in contact with the surface of the plate and movement when the objective is not in contact with the plate. The controller can be configured to calculate the amount of oil lost from the objective as a result of such movement, as well as the amount of oil that is lost when the objective is lowered along the Z-axis so that it is brought out of contact with the plate. In some embodiments the controller also takes into account the effect of differences in the plate material on the amount of oil lost as the objective is moved along the plate or removed from contact with the plate. Alternatively or additionally, the amount of oil lost may be tracked by monitoring the change in the weight of the oiled objective from the time it is oiled, and/or by inspection of the thickness of the oil on the objective, for example with a camera or by measuring with a laser.

At step 716, which may occur continuously or periodically, the controller checks whether the amount of oil lost as a result of objective lens movement is greater than maximal threshold amount established at step 704. If the traversed distance is smaller than the maximal threshold oil loss, scanning continues at step 714.

Otherwise, if the calculated amount of oil lost is equal to, or greater than, the maximal threshold amount, at step 718 the objective is lowered relative to plate 600, and is moved, in a XY plane, to the oil loading position. A replenishing amount of oil is then loaded onto the objective at step 720, substantially as described hereinabove with respect to step 706, with the exception that the replenishing amount of oil may be smaller than the initial amount of oil. As discussed hereinabove, the amount of oil required for replenishing the oil drop on the objective may be computed, for example based on the weighing mechanism, or may be approximated based on the distance traversed by the objective lens, or based on any other relevant parameter. The flow then returns to step 708, for moving the objective lens back to the scanning position for continued scanning of the sample.

Reference is now made to FIGS. 21A and 21B, which are flow charts outlining embodiments of a method for automatically focusing an oil-loaded oil-immersion lens on a biological sample, in accordance with embodiments of the invention. The method of FIGS. 21A and 21B assumes that an initial scanning height, typically of several microns from the approximate Z-axis location of the lower surface of the plate, is known. The initial scanning height is typically based on the height of the lower surface of the plate, as established, for example, at step 700 of FIG. 20. This automatic focusing is conducted each time the lens is repositioned at a different XY position, including after oil replenishment.

The initial scanning height is one in which it is known that the oil drop, disposed on the oil objective, engages the oil objective and the lower surface of the plate, and is spread therebetween. As noted above, typically the oil is formulated to have the same index of refraction as the material of which the bottom of the plate is constructed, which is often glass. The immersion oil, and the initial scanning height, are thus selected to ensure that there are no unwanted reflections, or refractions, when light passes between the oil and the material of the multi-well plate, viz. to ensure that the oil is in contact with both the lens and the bottom of the plate. As such, when a light beam is passed from the objective into the sample, via the oil and the material of the plate, the light will only be refracted once, at the transition between the material of the plate and the material of the sample, which occurs at the upper surface of the wells.

Turning to FIG. 21A, it is seen that in an initial step 750 of the focusing process, the objective is brought to the predetermined initial height, which is already known, so that the oil is brought into contact with the lower surface of the plate. This is equivalent to step 710 of FIG. 20. A delay of a predetermined duration, e.g. 500 to 2000 milliseconds, is waited before proceeding to the next step of the method, in order to allow the oil-surface interaction to stabilize. At step 752, the reflection of a laser signal, emitted via the objective, is measured.

At step 754, the objective is moved to another height along the Z-axis, closer to the lower surface of the plate, and the reflection of the laser signal at the new position is measured at step 756. The reflection value, at the new Z-axis height, is recorded. This process is then repeated, essentially continuously. The measurement is expected to increase, until the focus distance is reached, and then to begin decreasing.

At step 758, the controller evaluates the collected reflection data and evaluates whether there has been a decrease in the measured reflection of the signal over the last several iterations. If not, the flow returns to step 754 for measurement of the signal at a new Z-axis position. If however the measured reflection decreases, at step 760 the objective is moved to the Z-axis position at which the signal was maximal. This position along the Z-axis is considered the focus distance of the objective, with respect to the sample.

In some embodiments, the decay is considered sufficiently significant if it is a continuous decay of 0.1V in the laser signal.

The method of FIG. 21 is used to find the focus distance of the sample each time a new sample, or plate, is scanned, and following each replenishing of immersion oil.

In some embodiments, a similar process is used to ensure that the objective is focused, for example when moving to a new field of the plate or when the objective has been standing in a single position, imaging for a long time in the same position (e.g. to avoid the problem of drift from the predetermined position). However, when moving to a new field, or recalculating when the objective has been standing a single position for a long time, the previous focus distance is known. As such, in this situation, at step 752 the objective is moved between heights in the range of known_focus_distance±predetermined_search_range. Here too, the focus distance is determined to be at the point at which the maximal signal is obtained.

Turning to FIG. 21B, it is seen that in an initial step 770 of the focusing process, the objective is brought to the predetermined initial height, which is already known, so that the oil is brought into contact with the lower surface of the plate. This is equivalent to step 710 of FIG. 20. A delay of a predetermined duration, e.g. 500 to 2000 milliseconds, is waited before proceeding to the next step of the method, in order to allow the oil-surface interaction to stabilize. At step 772, the reflection of a laser signal, emitted via the objective, is repeatedly measured while the objective is moved a pre-determined distance along the Z-axis. The pre-determined distance along the Z-axis is selected such that it is expected that the measured reflection of the signal will reach a peak, and then decrease, during the Z-axis motion of the objective.

At step 774, the best fitted Gaussian (or polynomial) curve of the signal peak collected over all measurements taken at step 772 is calculated to determine the peak maximum, and the objective is moved to the Z-axis position at which the Gaussian (or polynomial) was maximal. This position along the Z-axis is considered the focus distance of the objective, with respect to the sample.

At step 776, the objective is moved to the focus distance determined at step 774, and scanning is initiated. As part of the scanning, images of the sample are taken at the focus position, until the scanning of the region is complete, or until a maximal scanning duration has passed.

At step 778, the controller evaluates whether the scanning of the region is complete. If the scanning of the region is complete, the objective is lowered and is moved to a new XY position at step 780. The flow then returns to step 770, for refocusing of the objective at the new location.

Otherwise, if the scanning of the region is not complete, at step 782, the controller evaluates whether the maximal scanning duration has passed. If the maximal scanning duration has not passed, flow returns to step 776 and scanning is continued. If the maximal scanning duration has passed, the flow returns to step 772 for refocusing of the objective, and ensuring that there has been no drift of the objective or sample during the scanning process. However, when moving to a new field or remaining in the same position for a long time, the previous focus distance is known. As such, in this situation, at step 772 the objective is moved between heights in the range of known_focus_distance±predetermined_search_range. Here too, the focus distance is determined to be at the point at which the maximal signal is obtained.

In some embodiments, the decay is considered sufficiently significant if it is a continuous decay of 0.1V in the laser signal.

The method of FIG. 21B is used to find the focus distance of the sample each time a new sample, or plate, is scanned, and following each replenishing of immersion oil.

Reference is now made to FIGS. 22A, 22B and 23, which show flowcharts outlining methods of scanning, as well as image processing and analysis, in accordance with embodiments of the invention. The flowchart in FIG. 22A outlines the scanning process according to some embodiments of the present invention. Initially, a first scanning operation of a target is performed according to user-defined parameters, such as size (e.g. ignore objects larger than and/or smaller than a particular size), shape (ignore non-circular objects or non-semi-circular objects), intensity, etc. The scanned image so obtained is then processed to identify objects of interest and their characteristics; this processing may be effected using image processing algorithms that are presently known in the art or that may be developed in the future. The image processing results are then analyzed according to predefined rules for determining the optimal parameters for performing further scanning operations of the same area. Based on the results of this analysis, new parameters are defined for scanning to acquire a new image of the same target. At least one second scanning operation is then performed using the new scanning parameters. Thus, for example, the system may scan a biological sample plate having 96 wells of 6 mm diameter each. During the scan, the image processing algorithm recognizes each living cell present in the plate; if two or more cells are attached together, or if there are individual cells larger than a certain size, the system may note this as an unusual event which should be observed further using higher magnification optics; if an objective lens changer such as the one described above is present, the lens can be changed to facilitate such observation. The system then determines the parameters that define the proper image quality for the high magnification scan. In some embodiments, the image processing is performed while the first scanning operation is still running, in which case the results of the analysis may affect the operations of the scanning in real time, in accordance with the newly-defined parameters. In some embodiments the at least one second scanning operation is performed at higher magnification than the first scanning operation; in some embodiments, in which the present method is utilized in conjunction with an apparatus equipped with an objective lens changer as described above, the second scanning operation at higher magnification is performed by changing to a higher magnification objective lens using the objective lens changer and then scanning the areas of interest at higher magnification.

FIG. 22B is a flowchart of the scanning process in accordance with some embodiments of the present invention. At the first stage of the scanning, a low magnification image at a defined location is acquired; this process is repeated until images at a plurality of defined locations are acquired. Upon acquisition, each scanned image is transferred to an image processing and analysis module, which begins image processing and analysis upon receipt of the first image; this module may be incorporated into the software controlling the overall operation of the optical device or may be located at a different software application or computer. The processing and analysis module uses the results of the processing and analysis to begin generating a location matrix which includes information about areas of interest in accordance with objects identified by the initial scan and their characteristics. The location matrix may thus be completed shortly after completion of the low magnification scan. Alternatively, the location matrix may be generated after all processing and analysis is complete. On the basis this location matrix, the second stage of scanning is performed, during which high magnification images at specified locations of interest are acquired.

FIG. 23 is a flowchart of the image processing and analysis process according to some embodiments of the present invention. At the first stage of the image processing the following steps are performed: acquire a small magnification image, apply a low pass filter to the data obtained, apply a high pass filter to the data obtained, and perform a Watershed transformation. On the basis of these image processing steps, objects and object attributes/characteristics are detected and extracted. Next, relevant objects are selected using user parameters/attributes/characteristics, and object centers (L[Cx,Cy]) are extracted. High-magnification images of the selected objects are then obtained, from which a 3D transformation matrix between objects (M) is then created, and then utilized.

FIG. 24 is a perspective view illustration of an oil loading subassembly 1200, in accordance with another embodiment of the present invention. Oil loading subassembly 1200 is substantially similar to oil loading subassembly 200 of FIGS. 13 to 14D, with like numbers representing like elements. For brevity, the following description focuses on the distinctions between oil loading subassembly 1200 and oil loading subassembly 200.

As seen, oil loading subassembly 1200 includes a main body portion 1210, which includes a central oil basin 1212, which may be in fluid communication with an oil viewing opening, and a pump-seat bore, terminating in a pump inlet conduit, as described hereinabove with respect to FIG. 14D). Similarly to that shown in FIG. 14D, an oil flow conduit extends from the base of oil basin 1212 adjacent the pump inlet conduit, and terminates at an edge of main body portion 1210, where the oil flow conduit is sealed by a stopper. An observation window, as described hereinabove with respect to FIG. 14B, may be disposed within, and may seal, the oil viewing opening, although as explained above such a window is not required.

A cartridge puncturing element 1230 is seated within central oil basin 1212, and may be attached thereto by any suitable attachment mechanism, such as fasteners, soldering, adhesion, and the like. Cartridge puncturing element 1230 includes a base 1234 and a central puncturing pin 1236, having a hollow channel 1238 extending longitudinally therethrough, the channel terminating in a sharp tip and being in fluid communication with a bore 1239 formed in the side of cartridge puncturing element 1230. A pair of peripheral puncturing pins 1240 extend from edges of base 1234, and may be substantially parallel to each other. Each of puncturing pins 1240 is substantially planar, and has a first thickness for most of the longitudinal length thereof. An end of each puncturing pin 1240, distal to base 1234, has a second thickness, smaller than the first thickness, such that a shoulder 1242 is formed near the end of the puncturing pin. Each puncturing pin 1240 terminates in a sharp tip 1244.

When an immersion oil cartridge 1300 is installed in central oil basin 1212, as described hereinbelow with respect to FIGS. 26A and 26B, hollow channel 1238 of central puncturing pin 1236 is in fluid communication with central oil basin 1212 as well as with the oil flow conduit, in a similar manner to that shown in FIGS. 14D and 16A.

A diaphragm pump 1250 is disposed within the pump-seat bore, such that an inlet of pump 1250 is seated within the pump inlet conduit, and an outlet conduit 1254 of the pump (see FIGS. 26A and 26B) extends downwardly out of main body portion 1210, substantially analogous to what is shown in FIGS. 13 to 14D. As described hereinabove with reference to diaphragm pump 250, diaphragm pump 1250 is adapted to aspirate oil from the oil flow conduit, through the pump outlet conduit, onto an item disposed beneath the pump outlet conduit, which, in use, is an immersion oil objective lens.

Oil loading subassembly 1200 further include a base mount 1260, mounted onto a bottom side of main body portion 1210, and adapted for attachment of oil loading subassembly 1200 to other components of the microscopy system, above the lens changing subassembly 400. A back mount 1265 is mounted to main body portion 1210, rearwardly of central oil basin 1212. Both base mount 1260 and back mount 1265 may be connected to main body portion 1210 by any suitable way of connection, such as fasteners, adhering, soldering, and the like.

Reference is now additionally made to FIG. 25, which is a sectional illustration of an immersion oil cartridge 1300, according to another embodiment of the present invention.

As seen in FIG. 25, immersion oil cartridge 1300 includes a generally cylindrical housing 1301. Housing 1301 includes a base 1302, from which extends a first cylindrical wall portion 1304, having a first width, and defining a first chamber 1305 having a first internal diameter d1. A second cylindrical wall portion 1306 extends from first cylindrical wall portion 1304. Second wall portion 1306 has a second width, smaller than the first width. An external surface of second wall portion 1306 is flush with an external surface of first wall portion 1304, and an internal shoulder 1308 is formed between the internal surfaces of wall portions 1304 and 1306. A third cylindrical wall portion 1310 extends from second cylindrical wall portion 1306. Third wall portion 1310 has a third width, smaller than the second width, and forms a neck portion of cartridge 1300. An internal surface of third wall portion 1310 is flush with an internal surface of second wall portion 1306, and an external shoulder 1312 is formed between the external surfaces of wall portions 1310 and 1306. Third cylindrical wall portion 1310 terminates at a lip 1314, distal to base 1302. Second wall portion 1306 and third wall portion 1310 together define a second chamber 1315, having a second internal diameter d2. Second chamber 1315 is in fluid communication with first chamber 1305.

In some embodiments, an external surface of third wall portion 1310, distal to external shoulder 1312, may include snap fit engagement protrusions and/or grooves, adapted for snap fit engagement with corresponding grooves and/or protrusions in the internal circumference of central oil basin 1212.

A substantially cylindrical oil container 1320 is disposed within housing 1301, and defines a hollow 1321. A first end 1322 of oil container 1320 is disposed within first chamber 1305 and engages an internal surface of base 1302. A second end 1324 of oil container 1320 is substantially flush with lip 1314, such that the majority of oil container 1320 is disposed within second chamber 1315. Oil container 1320 includes a plurality of bores 1326, which are closer to first end 1322 than to second end 1324, while being in fluid communication with second chamber 1315. A cylindrical gap 1330 is formed between housing 1301 and oil container 1320, within second chamber 1315.

A substantially cylindrical pushing element 1340 is disposed about oil container 1320 within gap 1330, and is movable longitudinally relative to the oil container. A first end 1342 of pushing element 1340 is adapted to be disposed closer to first end 1322 of oil container 1320, and a second end 1344 of the pushing element is adapted to be disposed closer to second end 1324 of the oil container. Cylindrical pushing element 1340 includes a plurality of bores 1346, which are adapted to be radially aligned with bores 1326 of oil container 1320. The longitudinal alignment of bores 1346 and bores 1326 depends on the position of pushing element 1340 relative to oil container 1320, as explained in further detail hereinbelow.

First end 1342 of pushing element 1340 is adapted to push against an annular O-ring 1350, which is disposed within gap 1330. As explained in further detail with respect to FIGS. 26A and 26B, when O-ring 1350 is disposed below bores 1326, it seals gap 1330 such that no fluid path exists between hollow 1321 and gap 1330. By contrast, when O-ring 1350 is pushed to lie against shoulder 1308, and bores 1326 and 1346 are aligned with one another, as shown in FIG. 25, a fluid path is formed between gap 1330 and hollow 1321, via bores 1326 and 1346.

In a storage operative orientation of cartridge 1300, a sealing foil 1360 (see FIG. 26A), or any other seal, is disposed against lip 1314 of housing 1301 and second end 1324 of oil container 1320 to seal oil within the cartridge. In the storage orientation, O-ring 1350 is disposed below bores 1326, and seals gap 1330 such that no fluid path exists between hollow 1321 and gap 1330.

Reference is now additionally made FIGS. 26A and 26B, which are sectional illustrations of steps of insertion of the immersion oil cartridge 1300 of FIG. 25 into the oil loading subassembly 1200 of FIG. 24.

As seen in FIG. 26A, cartridge 1300 is in the storage orientation, with lip 1314 of housing 1301, second end 1324 of oil container 1320, and second end 1344 of pushing element 1340 all being flush with one another, and disposed against sealing foil 1360. In the storage orientation, O-ring 1350 is disposed below bores 1326, against first end 1342 of pushing element 1340. The O-ring seals gap 1330 such that no fluid path exists between hollow 1321 and gap 1330. Oil 1365 is disposed within hollow 1321, such that a height of the oil does not extend above bores 1326.

To load cartridge 1300 into oil loading subassembly 1200, cartridge 1300 is moved toward central oil basin 1212, in the direction of arrow 1370, until central pin 1236 punctures sealing foil 1360 and enters hollow 1321. At this initial installation step, O-ring 1350 remains below bores 1326, and the fluid path between hollow 1321 and gap 1330 remains blocked.

As cartridge 1300 continues to be moved in the direction of arrow 1370, tips 1244 of peripheral puncturing pins 1240 puncture the periphery of foil 1360, in the vicinity of gap 1330. Shoulders 1242 of the peripheral puncturing pins 1240 engage second ends 1344 of pushing element 1340, and as the cartridge continues to be lowered, pressure applied to the second ends 1344 by shoulders 1242 moves the pushing element 1340 toward base 1302 of housing 1301, which in turn pushes O-ring 1350 toward shoulder 1308.

As seen in FIG. 26B, in the installed operative orientation of cartridge 1300, shoulders 1242 of peripheral puncturing pins 1240 and pushing element 1340 have pushed O-ring 1350 to rest against shoulder 1308. In this arrangement, bores 1346 of pushing element 1340 are aligned with bores 1326 of oil container 1320, such that a fluid path exists between central oil basin 1212, gap 1330, hollow 1321 of oil container 1320, and channel 1238 of central puncturing element 1236. In this arrangement, oil can flow out of container 1320 into central oil basin 1212, and operation of the system continues substantially as described hereinabove.

It will be appreciated that an oil- or other liquid dispensing apparatus such as that described herein may also be utilized in conjunction with a confocal microscope. Additionally, the illumination source need not necessarily be a traditional laser but may be a light-emitting diode (LED) or a combination or array of LEDs. Consequently, a microscope or scanner equipped with an oil- or other liquid dispensing apparatus such as described herein may be used in high-content imaging (HCI, also sometimes called high-content screening) to obtain images which can then be processed in accordance with known techniques, such as photo-activated localization microscopy (PALM) (see e.g. Betzig, E. et al., "Imaging intracellular fluorescent proteins at nanometer resolution", Science 313, 1642-1645 (2006)) or Stochastic Optical Reconstruction Microscopy (STORM) (see e.g. Rust, M. J., Bates, M. & Zhuang, X., "Sub-diffraction-limit imaging by stochastic optical reconstruction microscopy (STORM)", Nature Methods 3, 793-795 (2006)). In one embodiment, images obtained using an acquisition device equipped with an oil-dispensing apparatus such as described herein can be processed in accordance with super-resolution radial fluctuations (SRRF), as described in Gustafsson et al., "Fast live-cell conventional fluorophore nanoscopy with ImageJ through super-resolution radial fluctuations", Nature Communications 7:12471 (published Aug. 12, 2016). Such processing may be carried out using the ImageJ software plugin, freely available at https://henriqueslab.github.io/resources/NanoJ-SRRF/. The fact that the apparatus and methods described herein facilitate automated dispensing of oil (or other liquid) to the objective lens means that this apparatus can be combined in completely automated image acquisition: automated scanning, automated autofocusing, automated objective exchange, automated dispensing of lens immersion medium, and automated detection of the target of interest.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the general combination of parts that perform the same functions as exemplified in the embodiments, and includes both combinations and sub-combinations of the various features described hereinabove as well as variations and modifications thereof, which would occur to persons skilled in the art upon reading the foregoing description.

What is claimed is:

1. A microscopy device for viewing or imaging a sample disposed on a sample holder, comprising:
   a first liquid immersion objective lens having a three-dimensional orientation, said first liquid immersion objective lens being a turretless objective lens;
   a first liquid application location at which said sample holder cannot be placed, and a second location, different from said first location, at which said sample holder may be placed;
   an apparatus detached from said first liquid immersion objective lens and disposed at said first liquid application location, configured to apply a liquid to said first liquid immersion objective lens when said first liquid immersion objective lens is disposed at a first liquid application position beneath said apparatus;
   said apparatus further comprising at least one of (a) a weighing mechanism and an associated controller to calculate the amount of liquid applied to the first turretless liquid immersion objective lens on the basis of weight, (b) a mechanism for recording the number of drops of liquid applied to the first turretless liquid immersion objective lens and, on the basis of a calibrated average volume of a drop of liquid, calculate the amount of liquid applied to the first turretless liquid immersion objective lens; (c) a mechanism for calculating the amount of liquid removed from a liquid reservoir, whereby to calculate the amount of liquid applied to the first turretless liquid immersion objective lens; and
   a mechanism configured to move said first liquid immersion objective lens in XYZ coordinate space, without changing the three-dimensional orientation of said first liquid immersion objective lens, from said first liquid application position to a second scanning position having different X and Y coordinates than said first liquid application position, and in which said second scanning position liquid on said first objective lens is in contact with said sample holder when said sample holder is emplaced in said second location;
   the microscopy device further comprising a controller that, when said first liquid immersion objective lens is loaded with liquid and placed at said second scanning position and then moved along the Z axis toward the sample holder, enables determination of an in-focus Z-axis position.

2. The microscopy device of claim 1, wherein said device comprises a second liquid immersion objective lens, different from said first liquid immersion objective lens, said second liquid immersion objective lens being a turretless objective lens, and said mechanism is further configured to place said first liquid immersion objective lens in a first storage location, to take said second liquid immersion objective lens from a second storage location, and to move said second liquid immersion objective lens to at least one of said first liquid application position and said second scanning position.

3. The microscopy device of claim 2, wherein said device is configured to determine when to apply said liquid to said objective lens.

4. The microscopy device of claim 1, wherein said device is configured to determine when to apply said liquid to said objective lens.

5. The microscopy device of claim 1, wherein said liquid is an oil selected from the group consisting of a hydrocarbon-based oil and a silicon oil.

6. The microscopy device of claim 1, wherein said liquid is water.

7. A method comprising:

providing a microscopy device for viewing or imaging a sample disposed on a sample holder, the microscopy device comprising:

a first liquid immersion objective lens having a three-dimensional orientation, said first liquid immersion objective lens being a turretless objective lens;

a first liquid application location at which said sample holder cannot be placed, and a second location, different from said first location, at which said sample holder may be placed;

an apparatus detached from said first liquid immersion objective lens and disposed at said first liquid application location, configured to apply a liquid to said first liquid immersion objective lens when said first liquid immersion objective lens is disposed at a first liquid application position beneath said apparatus;

said apparatus further comprising at least one of (a) a weighing mechanism and an associated controller to calculate the amount of liquid applied to the first turretless liquid immersion objective lens on the basis of weight, (b) a mechanism for recording the number of drops of liquid applied to the first turretless liquid immersion objective lens and, on the basis of a calibrated average volume of a drop of liquid, calculate the amount of liquid applied to the first turretless liquid immersion objective lens; (c) a mechanism for calculating the amount of liquid removed from a liquid reservoir, whereby to calculate the amount of liquid applied to the first turretless liquid immersion objective lens; and a mechanism configured to move said first liquid immersion objective lens in XYZ coordinate space, without changing the three-dimensional orientation of said first liquid immersion objective lens, from said first liquid application position to a second scanning position having different X and Y coordinates than said first liquid application position, and in which said second scanning position liquid on said first objective lens is in contact with said sample holder when said sample holder is emplaced in said second location, the microscopy device further comprising a controller that, when said first liquid immersion objective lens is loaded with liquid and placed at said second scanning position and then moved along the Z axis toward the sample holder, enables determination of an in-focus Z-axis position, the microscopy device having placed therein, at said second location, a sample holder containing a sample;

using said apparatus to apply a liquid to said first liquid immersion objective lens located at said first liquid application position; and moving the first liquid immersion objective lens having said liquid disposed thereupon to said second scanning position.

8. The method of claim 7, wherein the distance between the first liquid immersion objective lens having said liquid disposed thereupon and a surface of said sample holder at the second scanning position is a predetermined distance from said surface of the sample holder.

9. The method of claim 8, wherein prior to moving the first liquid immersion objective lens having said liquid disposed thereupon to said second scanning position, the Z-coordinate of said surface is determined using an air objective lens, which is exchanged for said first liquid immersion objective lens prior to said using said apparatus to apply said liquid.

10. The method of claim 9, further comprising, after moving the first liquid immersion objective lens having said liquid disposed thereupon to said second scanning position, determining an in-focus position of the first liquid immersion objective lens.

11. The method of claim 10, further comprising, after determining said in-focus position of the first liquid immersion objective lens, returning the first liquid immersion objective lens to said first liquid application position and applying liquid thereto.

12. The method of claim 11, further comprising, after said determining said in-focus position of the first liquid immersion objective lens, scanning said sample, and wherein said returning is conducted in response to said scanning reaching a threshold value comprising one or more of: (a) liquid lost from said first liquid immersion objective as a function of the distance said first liquid immersion objective has travelled in the XY plane while scanning; (b) liquid lost from said first liquid immersion objective as a result of moving said first liquid immersion objective along the Z-axis away from the sample holder; (c) a measured reduction in weight of the liquid-bearing first liquid immersion objective; and (d) measured thickness of the liquid on the first liquid immersion objective.

13. The method of claim 11, further comprising, after returning the first liquid immersion objective lens to said first liquid application position and applying liquid thereto, moving the first liquid immersion objective lens to either (a) said second scanning position, or (b) a third position having different X and Y coordinates than said first liquid application position and at least one X or Y coordinate different from said second scanning position, in which said third position liquid on the first liquid immersion objective lens can be brought into contact with a sample holder placed in said second location.

14. The method of claim 9, further comprising acquiring a plurality of images of said sample via said first liquid immersion objective lens.

15. The method of claim 8, wherein prior to moving the first liquid immersion objective lens having said liquid disposed thereupon to said second scanning position, the Z-coordinate of said surface is determined using a second liquid immersion objective lens having a lower magnification than said first liquid immersion objective lens used for scanning the sample, which second liquid immersion objective is exchanged for first liquid immersion said objective lens prior to said using said apparatus to apply liquid to said first liquid immersion objective, said second liquid immersion objective lens being a turretless objective lens.

16. The method of claim 15, further comprising, after moving the first liquid immersion objective lens having said liquid disposed thereupon to said second scanning position, determining an in-focus position of the first liquid immersion objective lens.

17. The method of claim 16, further comprising, after determining said in-focus position of the first liquid immersion objective lens, returning the first liquid immersion objective lens to said first liquid application position and applying liquid thereto.

18. The method of claim 17, further comprising, after said determining said in-focus position of the first liquid immersion objective lens, scanning said sample, and wherein said returning is conducted in response to said scanning reaching a threshold value comprising one or more of: (a) liquid lost from said first liquid immersion objective as a function of the distance said first liquid immersion objective has travelled in the XY plane while scanning; (b) liquid lost from said first liquid immersion objective as a result of moving said first liquid immersion objective along the Z-axis away from the sample holder; (c) a measured reduction in weight of the liquid-bearing first liquid immersion objective; and (d) measured thickness of the liquid on the first liquid immersion objective.

19. The method of claim 17, further comprising, after returning the first liquid immersion objective lens to said first liquid application position and applying liquid thereto, moving the first liquid immersion objective lens to either (a) said second scanning position, or (b) a third position having different X and Y coordinates than said first liquid application position and at least one X or Y coordinate different from said second scanning position, in which said third position liquid on the first liquid immersion objective lens can be brought into contact with a sample holder placed in said second location.

20. The method of claim 8, wherein the sample holder is a commercial sample plate of a particular model, and prior to moving the first liquid immersion objective lens to said second scanning position, the Z-coordinate of said surface is determined on the basis of the average distance of the bottom of said particular model plate from the bottom edge of the plate, in combination with the dimensions of the microscopy device.

21. The method of claim 20, further comprising, after moving the first liquid immersion objective lens having said liquid disposed thereupon to said second scanning position, determining an in-focus position of the first liquid immersion objective lens.

22. The method of claim 21, further comprising, after determining said in-focus position of the first liquid immersion objective lens, returning the first liquid immersion objective lens to said first liquid application position and applying liquid thereto.

23. The method of claim 22, further comprising, after said determining said in-focus position of the first liquid immersion objective lens, scanning said sample, and wherein said returning is conducted in response to said scanning reaching a threshold value comprising one or more of: (a) liquid lost from said first liquid immersion objective as a function of the distance said first liquid immersion objective has travelled in the XY plane while scanning; (b) liquid lost from said first liquid immersion objective as a result of moving said first liquid immersion objective along the Z-axis away from the sample holder; (c) a measured reduction in weight of the liquid-bearing first liquid immersion objective; and (d) measured thickness of the liquid on the first liquid immersion objective.

24. The method of claim 22, further comprising, after returning the first liquid immersion objective lens to said first liquid application position and applying liquid thereto, moving the first liquid immersion objective lens to either (a) said second scanning position, or (b) a third position having different X and Y coordinates than said first liquid application position and at least one X or Y coordinate different from said second scanning position, in which said third position liquid on the first liquid immersion objective lens can be brought into contact with a sample holder placed in said second location.

25. The method of claim 8, further comprising, after moving the first liquid immersion objective lens having said liquid disposed thereupon to said second scanning position, determining an in-focus position of the first liquid immersion objective lens.

26. The method of claim 25, further comprising, after determining said in-focus position of the first liquid immersion objective lens, returning the first liquid immersion objective lens to said first liquid application position and applying liquid thereto.

27. The method of claim 26, further comprising, after said determining said in-focus position of the first liquid immersion objective lens, scanning said sample, and wherein said returning is conducted in response to said scanning reaching a threshold value comprising one or more of: (a) liquid lost from said first liquid immersion objective as a function of the distance said first liquid immersion objective has travelled in the XY plane while scanning; (b) liquid lost from said first liquid immersion objective as a result of moving said first liquid immersion objective along the Z-axis away from the sample holder; (c) a measured reduction in weight of the liquid-bearing first liquid immersion objective; and (d) measured thickness of the liquid on the first liquid immersion objective.

28. The method of claim 26, further comprising, after returning the first liquid immersion objective lens to said first liquid application position and applying liquid thereto, moving the first liquid immersion objective lens to either (a) said second scanning position, or (b) a third position having different X and Y coordinates than said first liquid application position and at least one X or Y coordinate different from said second scanning position, in which said third position liquid on the first liquid immersion objective lens can be brought into contact with a sample holder placed in said second location.

29. The method of claim 8, further comprising acquiring a plurality of images of said sample via said first liquid immersion objective lens.

30. The method of claim 7, further comprising, after moving the first liquid immersion objective lens having said liquid disposed thereupon to said second scanning position, determining an in-focus position of the first liquid immersion objective lens.

31. The method of claim 30, further comprising, after determining said in-focus position of the first liquid immersion objective lens, returning the first liquid immersion objective lens to said first liquid application position and applying liquid thereto.

32. The method of claim 31, further comprising, after said determining said in-focus position of the first liquid immersion objective lens, scanning said sample, and wherein said returning is conducted in response to said scanning reaching a threshold value comprising one or more of: (a) liquid lost from said first liquid immersion objective as a function of the distance said first liquid immersion objective has travelled in the XY plane while scanning; (b) liquid lost from said first liquid immersion objective as a result of moving said first liquid immersion objective along the Z-axis away from the sample holder; (c) a measured reduction in weight of the liquid-bearing first liquid immersion objective; and (d) measured thickness of the liquid on the first liquid immersion objective.

33. The method of claim 31, further comprising, after returning the first liquid immersion objective lens to said first liquid application position and applying liquid thereto, moving the first liquid immersion objective lens to either (a) said second scanning position, or (b) a third position having different X and Y coordinates than said first liquid application position and at least one X or Y coordinate different from said second scanning position, in which said third position liquid on the first liquid immersion objective lens can be brought into contact with a sample holder placed in said second location.

34. The method of claim 7, further comprising acquiring a plurality of images of said sample via said first liquid immersion objective lens.

35. The method of claim 34, further comprising processing said plurality of images.

36. The method of claim 7, wherein said liquid is an oil selected from the group consisting of a hydrocarbon-based oil and a silicon oil.

37. The method of claim 7, wherein said liquid is water.

* * * * *